United States Patent [19]
Kuhn et al.

[11] Patent Number: 6,066,218
[45] Date of Patent: May 23, 2000

[54] METHOD AND APPARATUS FOR ASSEMBLING AN OPTICAL RECORDING MEDIUM

[75] Inventors: Gary K. Kuhn, Stillwater; Jack L. Perecman, Golden Valley, both of Minn.; Gary L. Romberg, River Falls, Wis.; Kevin J. Bangen, Scandia, Minn.; Richard E. Bennett, Hudson, Wis.

[73] Assignee: 3M Innovative Properties Company, St. Paul, Minn.

[21] Appl. No.: 09/065,295

[22] Filed: Apr. 23, 1998

[51] Int. Cl.⁷ .................................................. B32B 31/10
[52] U.S. Cl. ............................. 156/87; 156/160; 156/582
[58] Field of Search .............................. 156/295, 87, 558, 156/582, 285, 160

[56] References Cited

FOREIGN PATENT DOCUMENTS

| | | |
|---|---|---|
| 0 326 358 | 8/1989 | European Pat. Off. . |
| 0 405 582 A2 | 6/1990 | European Pat. Off. . |
| 0 509 472 A2 | 4/1992 | European Pat. Off. . |
| 2 693 149 | 1/1974 | France . |
| 2 606 198 | 5/1988 | France . |

OTHER PUBLICATIONS

Patent Abstracts of Japan, vol. 017, No. 550 (P–1624), Oct. 4, 1993 & JP 05 151625 A (TDK Corp), Jun. 18, 1993.
Patent Abstracts of Japan, vol. 013, No. 087 (P0835), Feb. 28, 1989 & JP 63 269301 A (Kanegafuchi Chem Ind CO Ltd), Nov. 7, 1988.
Patent Abstracts of Japan, vol. 015, No. 296 (P–1231), Jul. 26, 1992 & JP 03 102660 A (Fuji Photo Film Co Ltd), Apr. 30, 1991 & JP 03 102660 A (Fuji Photo Film Co) Apr. 30, 1991.

*Primary Examiner*—Michael W. Ball
*Assistant Examiner*—Gladys Piazza
*Attorney, Agent, or Firm*—James J. Trussell

[57] ABSTRACT

Methods and apparatus for applying a bonding layer to a member of an optical recording medium and for bonding together members of an optical recording medium. The methods and apparatus are useful for assembling optical recording media such as compact disks (CDs) and digital versatile disks (DVDs), and are particularly well suited for use with pressure sensitive adhesives. A preferred method of assembling together first and second members of an optical recording medium, wherein each of the members includes an inner surface and an outer surface, wherein at least one of the inner surfaces includes a bonding layer thereon, and wherein at least one of the members includes a data storage surface, includes the steps of: a) curving the first member such that the first member inner surface is convex, wherein the first member inner surface includes an outer annulus, and wherein the outer annulus includes a first portion and a second portion; b) orienting the second member such that the second member inner surface faces the first member inner surface, wherein the second member inner surface includes an outer annulus, and wherein the outer annulus includes a first portion and a second portion; c) contacting the first portion of the first member outer annulus and the first portion of the second member outer annulus together under pressure; and d) rotating the first and second members relative to one another so as to progressively contact under pressure the first member inner surface and second member inner surface together from their respective outer annulus first portions to their respective outer annulus second portions to thereby attach together the inner surfaces of the first and second members. A similar method for applying the bonding layer to one member is disclosed. Also disclosed are apparatus for use with the above methods.

36 Claims, 14 Drawing Sheets

METHOD AND APPARATUS FOR ASSEMBLING AN OPTICAL RECORDING MEDIUM

TECHNICAL FIELD

The present invention relates to methods and apparatus for applying a bonding layer to one member of an optical recording medium such as a compact disk or a digital versatile disk, and to methods and apparatus for assembling members of an optical recording medium together.

BACKGROUND OF THE INVENTION

Optical recording media such as compact disks (CDs) have become very popular as a means for storing and/or reproducing information such as audio information, video information or other data. CDs with one information surface usually include, for example, a spiral or segmented information track composed of convex and concave portions (pits) formed on the surface of a disk-shaped resin substrate comprising, for example, polymethylmethacrylates and polycarbonates. A reflection film of, for example, aluminum (Al) is deposited on the information bearing surface of the substrate and a protection film is formed thereon.

The storage capacity of such a CD is too small to store, for example, moving-picture information such as a movie for a sufficiently long recording or play time. In order to increase the storage capacity, storage media having two disks which are adhered together, such as, for example, magneto-optical disks (MO) have been suggested.

Recently, a high storage capacity format for digital video storage has been suggested as DVD (digital versatile disk, sometimes also digital video disk). DVDs can be divided into DVD-ROMs which are exclusively for reproduction, and DVD-RAMs which can also be used for data storage, DVD-Rs which are recordable once ("write once, read many"), DVD-Audios and DVD-Videos. The format for DVD-ROMs, for example, has been provisionally defined by an industry (ECMA, Executive Committee of the DVD Consortium) as ECMA/TC 31/97/2, Geneva, Switzerland, January 1997, and presently comprises 4.7 gigabytes (GB), 8.5 GB, 9.4 GB and 17 GB formats. The different formats are described in some detail on p. 5 of ECMA/TC 31/9712 as types A–D and in EP 0,725,396 (see, in particular, FIG. IC–IF).

DVDs generally comprise two disk shaped members, the inner surfaces of which are bonded together with a bonding layer which must be light transmissive if the information on one or more of the recording layers is read through the bonding layer. In the 4.7 GB single layer format only one of the members comprises an information storing layer formed by the inner surface of the substrate which exhibits a sequence of pits with a minimum size of, for example, 0.4 μm. An Al layer is deposited on the information storing layer optionally followed by a protective coat. The inner surface of the second substrate which is a dummy substrate is bonded to the inner surface of the first member, i.e., for example, to the Al layer or to the protective coat layer. The 8.5 GB and, in particular, the 9.4 GB and 17 GB formats exhibit more complicated constructions and usually comprise an information storing layer on each substrate. For the 8.5 GB format a single side/dual layer construction is described on p. 3, FIG. 3 of the Bulletin: 101 December 1996 provided by Imation Corporation of Oakdale, Minn., available on the Internet under the address http://www.imation.com/dsp/optical/dvd/techbull.html.

Bonding of the two members of DVDs or other high storage capacity optical recording media is a particular problem because of the demanding technical requirements. In Tape-Disk Business, 10 (1996), no. 9, p.13, three bonding technologies are described using hot-melt adhesives, radically ultraviolet (UV) curable or cationically UV curable liquid adhesives, respectively. Hot-melt adhesives can be attached to the inner surface of the members, for example, by roll-coating whereas radically or cationically UV curable liquid adhesives can be applied with, for example, spin-coating or screen-printing techniques.

While UV-curable liquid adhesives may result in bondings having a low defect density or in a virtually "perfect bubble-free system" as is claimed in the Tape-Disk Business article, their use also has some disadvantages such as, for example, corrosion problems of the members and, in particular, of the reflective films used herein, the incompatibility of liquid adhesives with mass production requirements and handling problems as is pointed out in the background section of EP 0,330,197. Additionally, UV curing is usually difficult because of the high UV-absorbance of the substrates. This necessitates high UV intensities and/or long times for curing resulting in unacceptably high tilt or warpage. UV-curing at the edges of the members where oxygen is present, is difficult. EP 0,330,197 suggests the use of a smooth-surfaced silicone-based double-side pressure-sensitive adhesive film which is applied to the inner surface of the first disk, followed by pressurizing the first disk with the attached adhesive film between rollers, removing the release liner, attaching the second disk to the exposed pressure-sensitive adhesive film, and application of uniform pressure. A similar process is described in M. Nakamura et al., Two-sided tape used to glue DVDs together, Japanese Journal of Electronic Materials (Denshi Zairoy), special edition June 1996, pp. 46–49. In a first step the first member is secured with the first reflective layer being exposed, and the adhesive sheet is then adhered to the first substrate using a rubber roller. Then the release liner is removed from the adhesive layer, the inner surface of the second member is attached to the adhesive sheet and the assembly is then press-bonded in a pressure boiler to expel the bubbles which have been formed during the lamination step. Expelling the bubbles requires that the second substrate is pushed down towards the exposed adhesive layer adhered to the inner surface of the first substrate using, for example, a pressure cylinder exerting high pressure. This often results, however, in the formation of large bubbles and/or an irreversible deformation of the adhesive layer near the bubble. Another problem is that the pressure sensitive adhesive layer is squeezed out between the edges of the members. The surface of the members typically is not essentially flat but may comprise protrusions or indentations. Disk-shaped members with a centered hole, for example, typically exhibit a rim around said centered hole to allow for stacking the optical recording medium on a vertically extending pin. When quickly pushing down the second member by means of a piston, for example, any mismatch in the orientation between the piston and the second member may result in introducing high tilt or warpage and/or scratches on the surface of the member. When using a piston it is furthermore difficult to bond the members together without creating unacceptable high values of tilt and/or warpage in the DVD. Pushing down the second member onto the exposed adhesive layer and expelling the air is required in the method described in the above article from the Japanese Journal of Electronic Materials to obtain cycle times of no more than 10 seconds per DVD.

The use of a double-sided adhesive layer in DVDs is also mentioned, for example, in JP 07-262,619, JP 07-014,215 and JP 08-096,415.

It is seen that it is desirable to provide an apparatus and method for applying a bonding layer to a member of an optical recording medium that minimizes or eliminates entrapped bubbles and/or that provides a flat member. It is also desirable to provide an apparatus and method for assembling two members of an optical recording medium that minimizes or eliminates entrapped bubbles and/or that provides a flat medium. Preferably, such an apparatus and method is particularly well suited for use with pressure sensitive adhesives, although it is not limited thereto.

SUMMARY OF THE INVENTION

One aspect of the present invention provides a method of assembling together first and second members of an optical recording medium Each of the members includes an inner surface and an outer surface, at least one of the inner surfaces includes a bonding layer thereon, and at least one of the members includes a data storage surface. The method comprises the steps of: a) curving the first member such that the first member inner surface is convex, wherein the first member inner surface includes an outer annulus, and wherein the outer annulus includes a first portion and a second portion; b) orienting the second member such that the second member inner surface faces the first member inner surface, wherein the second member inner surface includes an outer annulus, and wherein the outer annulus includes a first portion and a second portion; c) contacting the first portion of the first member outer annulus and the first portion of the second member outer annulus together under pressure; and d) rotating the first and second members relative to one another so as to progressively contact under pressure the first member inner surface and second member inner surface together from their respective outer annulus first portions to their respective outer annulus second portions to thereby attach together the inner surfaces of the first and second members.

In a preferred embodiment of the above method, step b) further includes curving the second member such that the second member inner surface is convex. More preferably, steps a) and b) comprise curving the first and second members to substantially the same contour.

In another preferred embodiment of the above method, step a) comprises curving the first member to an arcuate contour. In another embodiment, steps a) and b) comprise curving the first and second members to an arcuate contour. Optionally, step d) further includes maintaining the entire inner surface of one of said first and second members curved.

Another preferred embodiment of the above method includes the further step of: e) concurrently with step d), progressively releasing the curvature of the other one of said first and second members as the members attach together.

Another preferred embodiment of the above method includes the further step of: e) concurrently with step d), progressively releasing the curvature of both of said members from the respective first portions of the annulus to the respective second portions of the annulus as the members attach together.

Preferably, step d) of the above method further includes translating the first member about a first arcuate path and translating the second member about a second arcuate path.

In another preferred embodiment of the above method, step a) includes releasably mounting the first member on a first fixture having a convex surface. This step can further comprise releasably mounting the first member on a convex surface of a resilient pad on the fixture. In one embodiment, the resilient pad is a foam pad In one preferred embodiment, the first member is held to the convex surface of the fixture by a vacuum.

In another preferred embodiment of the above method, step a) includes releasably mounting the first member on a first fixture having a convex surface, and wherein step b) includes releasably mounting the second member on a second fixture having a convex surface.

Another aspect of the present invention provides a method of applying a bonding layer to a member of an optical recording medium. The bonding layer includes an exposed surface. The member includes an inner surface and an outer surface. The method comprises the steps of: a) curving the member such that the member inner surface is convex, wherein the member inner surface includes an outer annulus, and wherein the outer annulus includes a first portion and a second portion; b) orienting the bonding layer such that the exposed surface of the bonding layer is facing the member inner surface; c) contacting the first portion of the member outer annulus and exposed surface of the bonding layer together under pressure; and d) progressively contacting the exposed surface of the bonding layer from the first portion of the member outer annulus to the second portion of the member outer annulus to thereby bond together the member inner surface and the bonding layer.

In a preferred embodiment of the above method, step b) further includes curving the bonding layer such that the exposed surface is convex. More preferably, steps a) and b) comprise curving the member and the bonding layer to substantially the same contour.

In another preferred embodiment of the above method, step a) comprises curving the member to an arcuate contour. More preferably, steps a) and b) comprise curving the member and the bonding layer to an arcuate contour.

In another preferred embodiment, step d) further includes maintaining the entire inner surface of the member curved.

In another preferred embodiment of the above method, step d) further includes translating the member about a first arcuate path and translating the bonding layer about a second arcuate path.

The above method may further include bonding a second member to the first member which already has a bonding layer thereon. Preferably, this is done in accordance with any of the embodiments of the first method described above.

Yet another aspect of the present invention provides an apparatus for releasably supporting a first member of an optical recording medium during assembly of the medium. The apparatus comprises: a) a frame; b) a first rotary support mounted on the frame; and c) a first fixture mounted on the rotary support, the fixture including a first convexly curved surface for releasably holding the optical recording medium member; wherein the rotary support is mounted on the frame so as to rotate about a first axis from a first position to a second position, and wherein the first axis does not intersect the convexly curved surface.

In one preferred embodiment of the above apparatus, the fixture further includes a first resilient pad, the resilient pad including the convexly curved surface. Preferably, the resilient pad is a foam pad.

In another preferred embodiment of the above apparatus, the fixture further includes a first locating pin extending from the convexly curved surface for engagement with the optical recording medium member. Preferably, the pin is mounted on the fixture so as to be able to move from a first position wherein the pin extends a first distance from the convexly curved surface to a second position wherein the pin extends a second smaller distance from the convexly curved surface. Preferably, the pin is biased towards the first position.

In another preferred embodiment of the above apparatus, the fixture is attached to a vacuum source, and the convexly curved surface includes holes therein in communication with the vacuum source.

In another preferred embodiment, the convexly curved surface of the fixture includes a pressure sensitive adhesive thereon for releasably securing the optical recording medium member.

In another preferred embodiment of the above apparatus, the convexly curved surface of the fixture is arcuate. Preferably, the arcuate surface of the fixture is at a radial distance from the rotary support first axis, and the arcuate surface has a radius of curvature substantially equal to the radial distance.

In another preferred embodiment of the above apparatus, the apparatus further comprises: d) a second rotary support mounted on the frame; and e) a second fixture mounted on the rotary support, the second fixture including a second convexly curved surface for releasably holding a second member of the optical recording medium member. When the first and second rotary supports are in their respective first positions, the first and second fixtures are not aligned with one another, and when the first and second rotary members are in their second respective positions, the first and second fixtures are aligned with one another. The second rotary support is mounted so as to rotate about a second axis from a first position to a second position, wherein the second axis does not intersect the second convexly curved surface.

The present invention also provides a member of an optical recording medium having a bonding layer thereon applied by any of the methods described herein. The present invention also provides an optical recording medium comprising two members assembled together by any of the methods described herein.

Certain terms are used in the description and the claims that, while for the most part are well known, may require some explanation. It should be understood that when referring to elements of the optical recording medium or the assembling apparatus as being "curved," this means that such an element bends in a smooth, continuous fashion. When referring to a curved element as being "arcuate," this means that such an element has the shape of a segment of a circle. The term "data storage surface" refers to a surface in or on one or both of the first and second members of the optical recording medium that already contains optically readable data or that is capable of having optically readable data subsequently imparted thereon.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The optical recording media prepared with the apparatus of the present invention or by the method of the present invention comprises a first member and a second member, the inner surfaces of which are bonded together with a bonding layer. The first member comprises a first substrate, a first data storage layer which may be readable and/or writable, a first inner surface, and a first outer surface. The second member comprises a second substrate, a second inner surface, a second outer surface, and optionally a second data storage layer which may be, if present, readable and/or writable.

Figure 1:
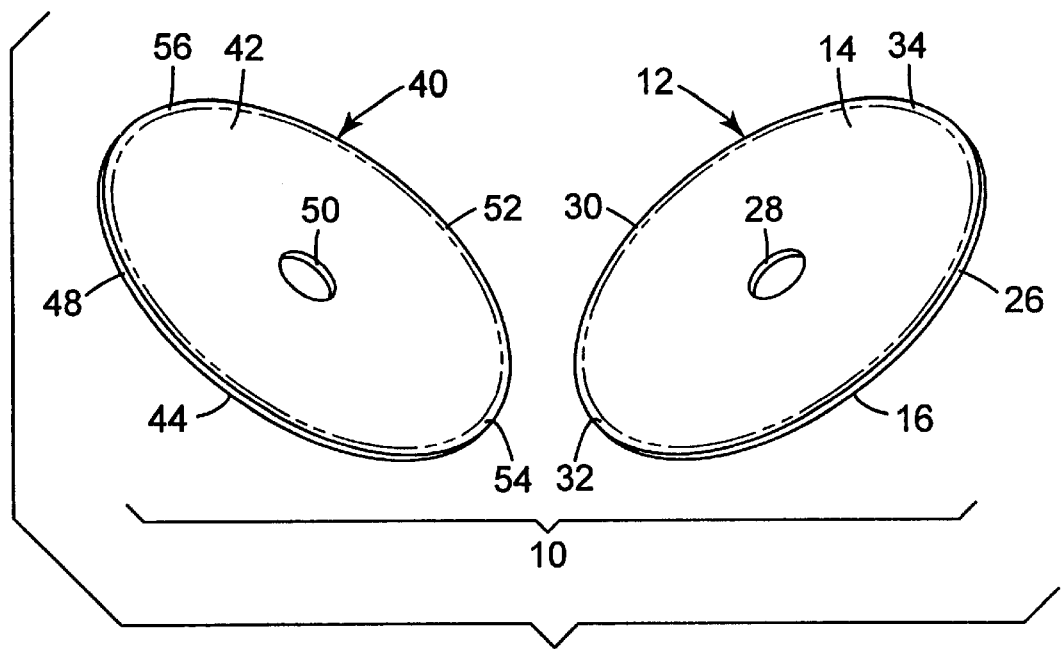
FIG. 1 is an exploded view showing the first and second members of an optical recording medium according to a preferred embodiment of the present invention.

FIG. 1 illustrates (in exploded view) one example of an optical recording medium 10 which may be made with the apparatus or method of the present invention. The optical recording medium 10 includes a first member 12 and a second member 40. First member 12 includes an inner surface 14 and an outer surface 16 opposite the inner surface. First member 12 also has an outer diameter (OD) 26 and an inner diameter (ID) 28. For purposes of explaining the present invention, it is useful to define an inner surface outer annulus 30 on the first member 12. It is understood that this annulus may simply be a region on the inner surface 14, and need not be a discrete identifiable structure or element of the first member 12. Outer annulus 30 includes a first portion 32 and a second portion 34. In the preferred embodiment, first and second portions 32, 34 are diametrically opposed from one another. Second member 40 of optical recording medium 10 includes an inner surface 42 and an outer surface 44 opposite the inner surface. Second member 40 also includes an outer diameter 48 and an inner diameter 50. As with the first member 12, it is useful to define an inner surface outer annulus 52 on the inner surface 42 of the second member. Outer annulus 52 includes a first portion 54 and a second portion 56 which in the preferred embodiment are diametrically opposed. For illustrative purposes, the bonding layer 60 between first and second member 12, 40 is omitted from FIG. 1.

Figure 2:
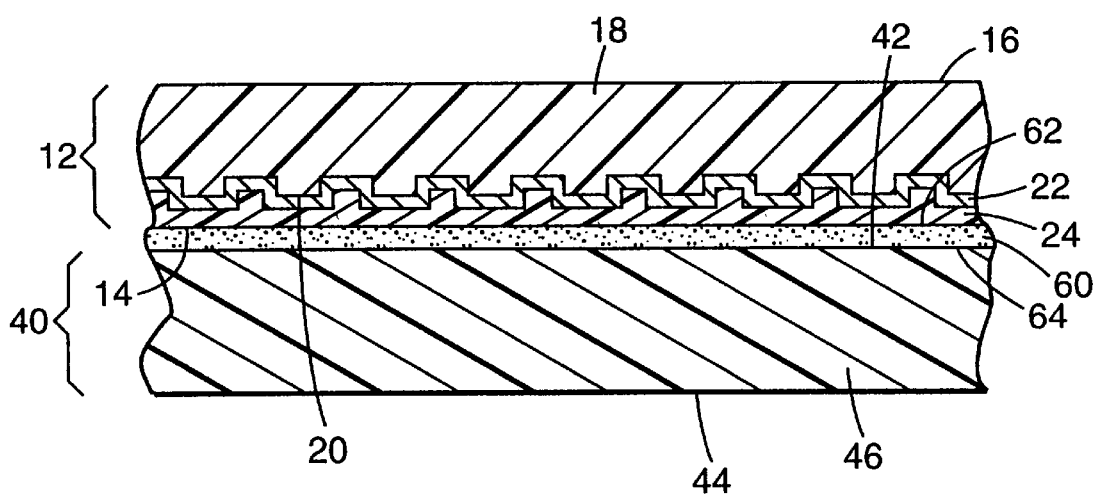
FIG. 2 is a cross-sectional view of the optical recording medium of FIG. 1.

FIG. 2 illustrates a cross section of a portion of the optical recording medium 10 of FIG. 1, which has been assembled with the inner surfaces 14 and 42 of the first and second members 12,40 facing one another with a bonding layer 60 therebetween. The optical recording medium 10 of FIG. 2 is representative of a 4.7 GB DVD (single side/single layer). The first member 12 comprises a first substrate 18 having a data storage surface 20 and an outer surface which in this embodiment also forms the outer surface 16 of the first member 12. The data storage surface 20 is coated with a metal layer 22 such as, for example, an aluminum layer which bears a protective layer 24 thereon. The exposed surface of the protective layer 24 forms the inner surface 14 of the first member 12. The second member 40 consists in the case of 4.7 GB DVD of a second substrate 46, having an inner, non-information storing surface which also forms the inner surface 42 of the second member, and an outer surface which also forms the outer surface 44 of the second member. A bonding layer 60 bonds inner surfaces 14 and 42 together. Bonding layer 60 includes a first side 62 facing the first member 12 and a second side 64 facing the second member 40.

Schematic representations of other, more complicated optical recording media or DVD constructions are shown, for example, in ECMA/TC 31/9712; EP 0,725,396; or the Bulletin: 101, December 1996 of Imation Corporation cited above.

The substrates 18, 46 may be of any shape but preferably they are disks exhibiting a center hole useful for centering the assembled disks in a recording or playing station. The disk or annulus shaped substrates preferably have an outer diameter 26, 48 of about 50 to about 360 mm and an inner diameter 28, 50 of about 5 to about 35 mm, and the thickness of each substrate preferably is between about 0.25 and 1.0 mm and more preferably between about 0.3 and 0.9 mm. However, it is understood that the apparatus and method of the present invention are useful with larger and smaller disks. Since the information is read out and/or written in by means of a light source such as, for example, a laser having, for example, emission lines in a wavelength range between 400–700 nm, more preferably between 600–660 nm, at least one of the substrates and, more preferably, both substrates 18, 46 are transparent to visible light, preferably exhibiting a transparency of at least 90% and more preferably of at least 95%. The transparency of the substrate can be measured, for example, according to ASTM D 1746. The substrates may comprise transparent materials such as glass or polymeric materials with acrylic resins, polycarbonates, epoxy resins, cyclic olefin copolymers, and polyolefins being preferred. Especially preferred are hard plastics such as polymethyl-methacrylates or polycarbonates.

The exposed, outer surfaces 16, 44 of the members 12, 40 may be formed by the exposed, outer surface of the substrates 18, 46, or may also bear additional layers such as, for example, a protective coating layer or a printable or printed film attached to the exposed surface of the substrate by an adhesive layer.

The inner surfaces 14, 42 of the substrates 18, 46 usually bear one or more other layers such as, for example, reflecting or semi-reflecting layers, spacer layers and protective coating layers. The inner surfaces 14, 42 of the members 12, 40 correspond to the exposed surface of the outermost layer attached to the inner surface of the substrate.

Either or both of the substrates 18, 46 may comprise one or more data storage layers. A data storage layer may be formed by an information track comprising convex and concave portions (pits) which may be molded into the inner surface of each substrate. In DVDs the track pitch typically is about 0.74 $\mu$m and the minimum pit length is about 0.4 pm as can be taken from EP 0,720,159 in order to provide a sufficiently high information storage density. Each substrate can comprise one or more further data storage layers such as, for example, a photopolymer 2P layer as is described, for example, in EP 0,729,142.

The apparatus and methods of the present invention may be used to prepare optical recording media having two members the inner surfaces of which are bonded together with a bonding layer, preferably a pressure sensitive adhesive layer. The specific construction of the members can vary widely. Examples of optical media which can be prepared according to the present invention comprise but are not restricted to magneto-optical (MO) disks and, in particular, digital versatile (or sometimes video) disks. DVDs are described, for example, to some detail in EP 0,729,142, EP 0,725,396 or EP 0,720,159, whereas details on MO disks can be taken, for example, from U.S. Pat. No. 4,670,316, U.S. Pat. No. 4,684,454, U.S. Pat. No. 4,693,943, U.S. Pat. No. 4,760,012, and U.S. Pat. No. 4,571,124.

The two members of the optical recording medium are bonded together with a bonding layer 60. In a preferred embodiment, bonding layer 60 comprises a double sided pressure-sensitive adhesive layer.

Many types of adhesive can be used for bonding layer 60. Preferably, the adhesive should be free of corrosive ions such as chloride ions and be capable of forming a flat bonding layer of uniform thickness so as to not interfere with data output mechanisms of optical medium. Thus, thermo-setting adhesives, thermoplastic adhesives, and contact adhesive films can be used so long as they are bondable under temperature and pressure of the bonding process. Adhesives which remain compliant after application are preferred because they have less tendency to transmit vibrations and less tendency to transmit mechanical stresses. The adhesives are preferred to be thermally, oxidatively, and hydrolytically stable at storage and use temperatures typically in the range of −30 to 80° C. The thickness of the bonding layer/adhesive is usually about 25–75 microns.

Pressure sensitive tapes or sheets, a hot melt adhesive, one-part or two-part curable compositions (such as thermally curable, ultraviolet (UV) curable or electron beam curable compositions), non-tacky contact responsive materials, or one-part anaerobic adhesives may be used as the bonding layer 60 in the practice of this invention. Such adhesives can comprise a thermoplastic elastomer (TPE) or an acrylate, methacrylate, vinyl ether, isocyanate, silicone, epoxy or urethane group, for example and can also contain a tackifier, softener, filler, antioxidant, or crosslinking agent. Preferred adhesives are those comprising acrylyl, siloxane, saturated hydrocarbon, and urethane polymers. Acrylate-based pressure sensitive adhesives which are particularly useful in the present invention include those described in U.S. Pat. Nos. 4,181,752 and 4,418,120; WO 95/13,331 or in Handbook of Pressure Sensitive Adhesive Technology; D. Satas ed.; Second Edition, New York 1989, pp. 396–491.

The pressure sensitive tape can comprise two adhesive layers, with or without a central substrate. If a central substrate such as polyester is present, an adhesive layer is present on each side of a central substrate. An example of a suitable pressure sensitive tape or sheet is Optically Clear Laminating Pressure Sensitive Adhesive #8142, available from Minnesota Mining and Manufacturing Company, St. Paul, Minn. (hereinafter "3M Company").

In general, a hot melt adhesive contains a base polymer and additives such as a tackifier, plasticizer, and wax. The ingredients of the adhesive are not particularly limited. The base polymer may be selected from polyolefinic resins, polyolefinic copolymers, synthetic rubbers, and mixtures thereof. Examples of suitable hot melt adhesives are JET MELT Adhesive 3748, a hydrocarbon resin mixed with rubber, polypropylene, polyethylene, and aliphatic wax, commercially available from 3M Company, and those described in U.S. Pat. Nos. 4,503,531; 5,059,462; and 5,188, 875; and European Patent Application EP 0 526 244.

The bonding layer can be a non-tacky contact responsive material which typically is a single film layer of adhesive, which is usually prepared by coating the adhesive onto a release liner. An example of non-tacky single layer adhesive is 3M Industrial Fasteners Non-Tacky Adhesive System SJ 3101 Fastener Strip and SJ 3102 Target Strip, commercially available from 3M Company.

One-part and two-part curable compositions useful in the practice of the invention include anaerobically curable adhesives such as those described in U.S. Pat No. 5,244,775; UV curable adhesives such as described in U.S. Pat. Nos. 5,167,996; 5,244,775; 4,760,012; and 5,214,947, and thermally curable such as epoxy-based adhesives as described in European Patent Application EP 0 624 870 for example.

The bonding layer can be applied to either or both of the members of the optical recording medium by any suitable means. Application methods include the preferred methods described in greater detail below, along with methods such as spin coating, spray coating, roll coating, dip coating, printing such as screen printing, lamination, and the like. The preparation of flat, uniform precision caliper pressure sensitive adhesive films is described, for example, in WO 95/29,766. The die coating method and the precision coating die used in this preparation are described in detail in WO 95/29,764 and WO 95/29,765. The bonding layer may be applied to one or both members of the optical recording medium.

If the bonding layer is curable, the curing may take place before, during, or after assembly of the members to one another. The curing can be accomplished by actinic radiation (e.g., UV), heat, or chemical reaction.

Figure 3:
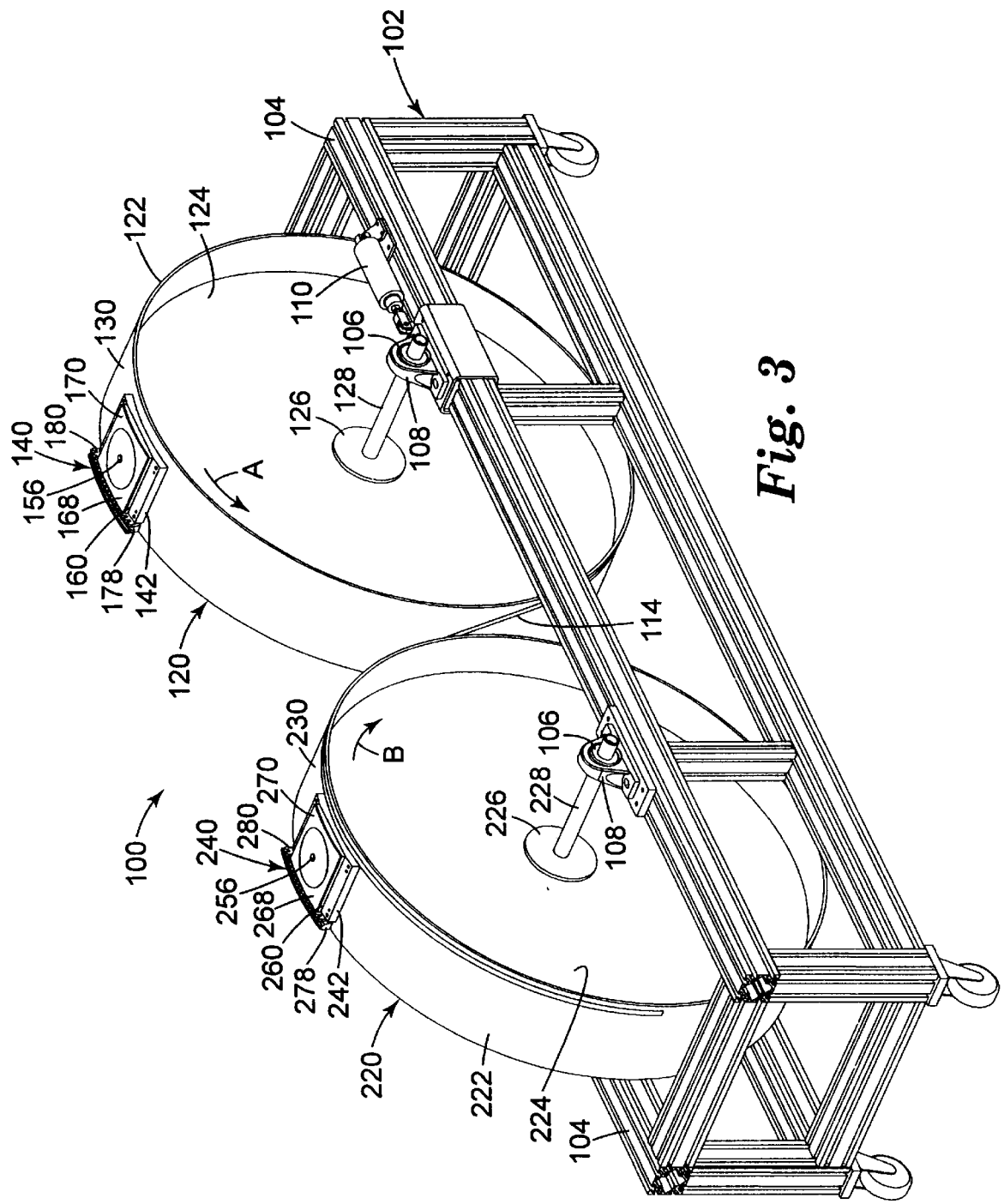
FIG. 3 is an isometric view of a preferred embodiment of the apparatus of the present invention, useful for carrying out a preferred embodiment of the method of the present invention.
Figure 4:
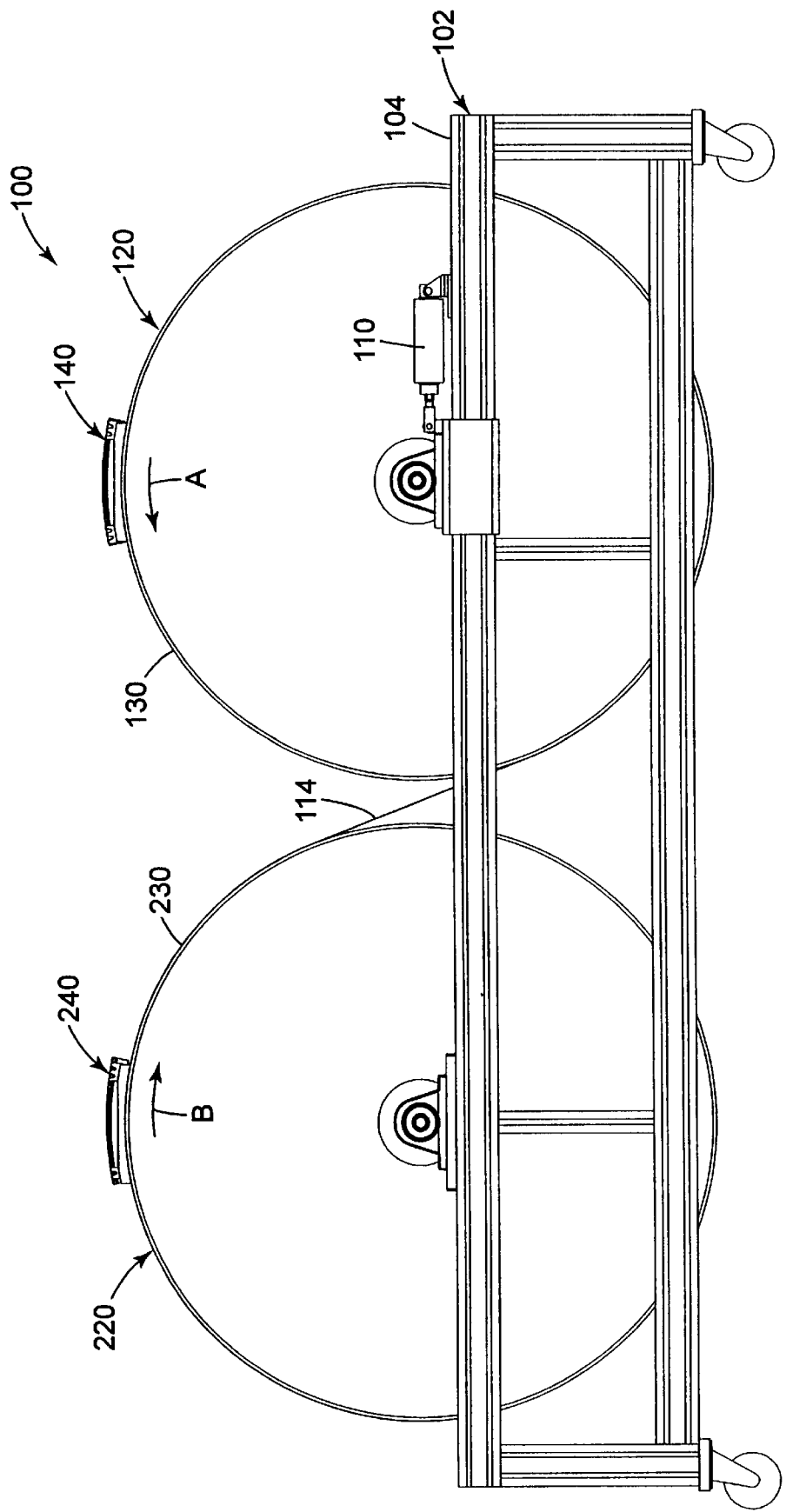
FIG. 4 is a side view of the apparatus of FIG. 3.

FIG. 3 is an isometric view of a first preferred embodiment of an apparatus of the present invention useful for carrying out a preferred embodiment of the method of the present invention. Apparatus 100 includes a frame 102 having mounting rails 104. Mounted on the rails 104 are first holder 120 and second holder 220. As illustrated in FIG. 4, first holder 120 and second holder 220 are attached by a flexible linkage 114 such that rotation of first holder 120 in direction A causes holder 220 to rotate in direction B. Returning to FIG. 3, extending from first holder 120 is a shaft 128 rotatably mounted by bearings 106 and bearing supports 108 onto the mounting rail 104. Bearing supports 108 are slidably mounted on rails 104. Attached to the bearing support 108 is a cylinder 110 which is used to adjust the gap between the first and second holders 120, 220 or to adjust the force applied between the two holders.

First holder 120 includes a rotary support 122 having a fixture 140 mounted thereon. Fixture 140 is configured to releasably hold the first or second member 12, 40 for assembly into optical recording medium 10. In the illustrated embodiment, the rotary support 122 comprises a circular center plate 124. Attached to the center plate 124 is a center flange 126 for mounting the rotary support 122 onto the shaft 128. Support 122 also includes an outer shelf 130 for supporting the fixture 140. In the preferred embodiment, outer shelf 130 is a circular cylindrical surface. As illustrated in greater detail in FIG. 5, the first fixture 140 includes a base 142, a base cover 160, an optional resilient pad 168, and a front surface 170 for releasably holding the first or second member 12, 40. Fixture 140 also includes a locator pin 156 sized and configured to closely fit the center hole defined by ID 28 or 50 in the first or second member 12 or 40.

Returning to FIG. 3, shaft 228 extends from second holder 220 and is rotatably supported by bearing 106 and bearing support 108 onto mounting rail 104 of the frame 102. Second holder 220 includes a rotary support 222 and a second fixture 240 for releasably holding the first or second member 12, 40 for assembly into the optical recording medium 10. Rotary support 222 includes a center plate 224, which in the preferred embodiment is a circular plate. Attached to center plate 224 is a center flange 226 for mounting the rotary support 222 onto shaft 228. Rotary support 222 also includes an outer shelf 230 attached around the periphery of center plate 224. In the preferred embodiment, outer shelf 230 defines a circular cylindrical surface. Mounted to the outer shelf 230 is the second fixture 240. As seen in greater detail in FIG. 8, second fixture 240 includes a base 242 attached to the outer shelf 230, a base cover 260 attached to the base, and an optional resilient pad 268 including a front surface 270. Fixture 240 also includes a second locator pin 256 for engagement with the center hole defined by the ID 28, 50 of the first or second member 12, 40.

Figure 5:
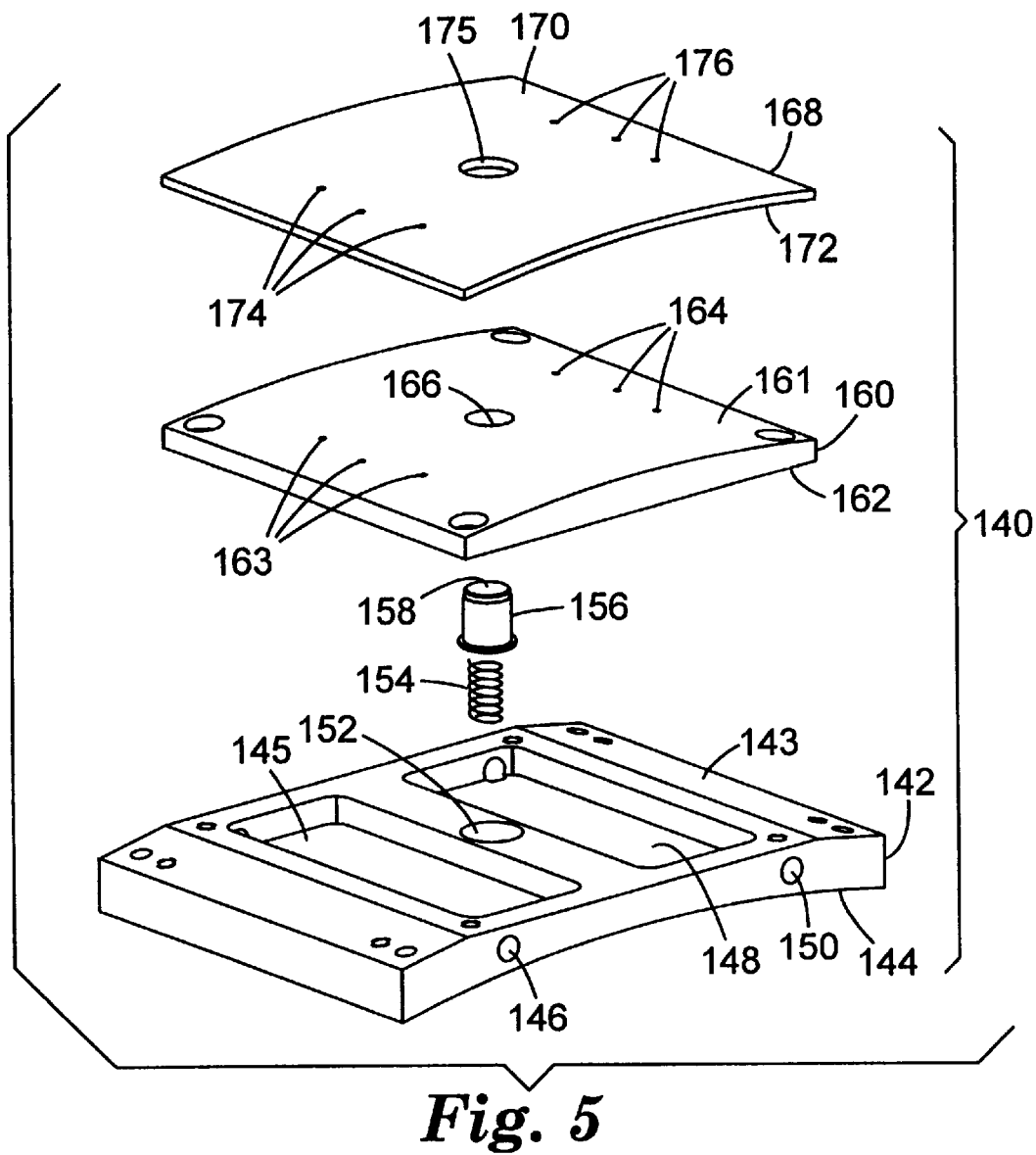
FIG. 5 is an exploded view of a preferred embodiment of a fixture for use with the apparatus and method of the present invention.

FIG. 5 is an exploded view of a preferred embodiment of the first fixture 140. Fixture 140 includes a base 142 having a front surface 143 and rear surface 144. Rear surface 144 is configured to be attached to the outer shelf 130, such as by bolts. In one preferred embodiment, a vacuum system is used to releasably attach the first or second member 12,40 to the fixture 140. In such an embodiment, base 142 includes a forward vacuum chamber 145 and a rear vacuum chamber 148. The base 142 includes a forward vacuum port 146 in communication with the forward vacuum chamber 145 and a rear vacuum port 150 in communication with the rear vacuum chamber 148. Base 142 also includes a pin mounting hole 152 for receiving a spring 154 and locator pin 156. Locator pin 156 includes tip 158. Attached to the front surface 143 of the base 142 is a base cover 160. Base cover includes a front surface 161 and a rear surface 162 which may be affixed to the front surface 143 of the base such as by bolts. In the illustrated embodiment, cover 160 provides a seal for the forward and rear vacuum chambers 145, 148. Cover 160 also includes a plurality of forward vacuum holes 163 in communication with the forward vacuum chamber 145 and a plurality of rear vacuum holes 164 in communication with the rear vacuum chamber 148. Cover 160 also includes a locator pin hole 166 therethrough which is sized to allow locator pin 156 to extend therethrough while retaining the locator pin 156 by the large diameter flange at the bottom of the pin. In the preferred embodiment, front surface 161 of the cover 160 is a convexly curved surface, and in a particularly preferred embodiment, front surface 161 is an arcuate surface that has a radius of curvature substantially equal to the radial distance from surface 161 to the center of rotation of first holder 120.

Also included in the illustrated embodiment of fixture 140 is an optional resilient pad 168. Resilient pad 168 includes a front surface 170 and a rear surface 172 which is secured to the front surface 161 of the base cover such as by an adhesive. Resilient pad 168 also includes in the illustrated embodiment a plurality of forward vacuum holes 174 in communication with the forward vacuum chamber through the vacuum holes 163 in the cover 160. Resilient pad 168 also includes a plurality of rear vacuum holes 176 in communication with the rear vacuum chamber 148 through the rear vacuum holes 164 in the base cover 160. Resilient pad 168 also includes a locator pin hole 175 for allowing locator pin 156 to extend therethrough.

Figure 6:
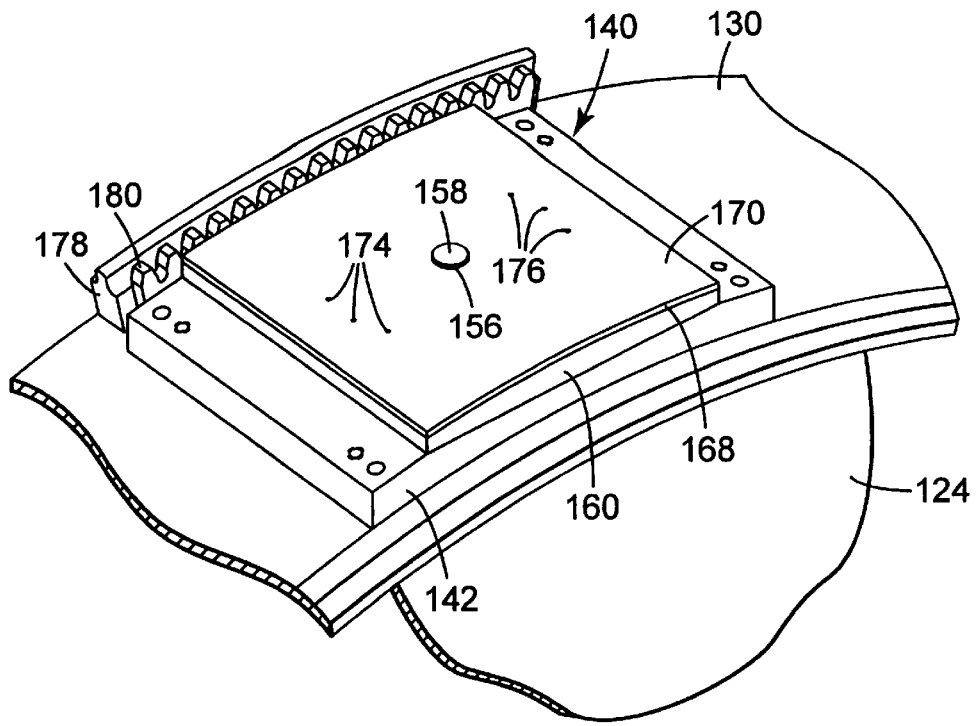
FIG. 6 is an isometric view of a first fixture mounted on the apparatus of FIG. 3.

The assembled fixture 140 is illustrated as being mounted on outer shelf 130 of the rotary support 122 in FIG. 6. It is seen that fixture 140 preferably includes a convexly curved outer surface 170 for releasably holding first or second member 12, 40. In embodiments which include the resilient pad 168, the front surface of the resilient pad defines the convexly curved surface 170 of the fixture 140. In a preferred embodiment, this convexly curved surface is an arcuate surface. In a particularly preferred embodiment, the radius of curvature of the curved surface 170 is equal to the radial distance from the surface 170 to the center of rotation of first holder 120.

In the embodiment illustrated in FIG. 5, fixture 140 includes two vacuum chambers 145, 148. These vacuum chambers releasably affix the first or second member 12, 40 to the first fixture 140 via the holes 163, 174 on the forward side of the fixture and holes 164, 176 on the rearward side of the fixture. Fixture 140 could instead include a larger number of smaller chambers arrayed across the base 142 with a corresponding number of sets of vacuum holes arrayed across outer surface 170 of the fixture 140. Furthermore, resilient pad 168 could instead be a porous pad in communication with a plurality of vacuum chambers.

Figure 7:
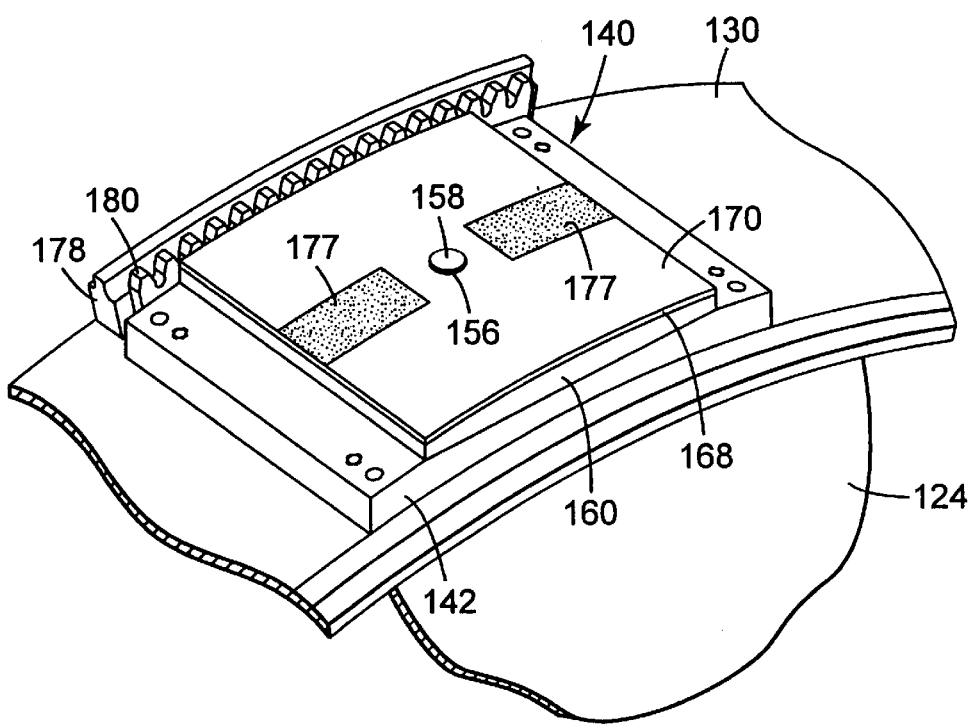
FIG. 7 is an isometric view of an alternate preferred embodiment of a fixture for use with the apparatus and method of the present invention.

In an alternative embodiment of fixture 140 illustrated in FIG. 7, members 12 and 40 may be releasably affixed by adhesion to the curved surface 170. This may be through inherent adhesive characteristics of the resilient pad (e.g., van der Waals forces, autoadhesion properties, and the like), such as with a silicone rubber pad. Releasable adhesion of the members to the surface may also be attained with an adhesive layer applied to the pad. For example, double sided tape 177 may be used to releasably affix first or second member 12, 40 to the convexly curved surface 170 of the fixture 140. In this embodiment, the vacuum chambers and vacuum holes are not necessary.

Figure 8:
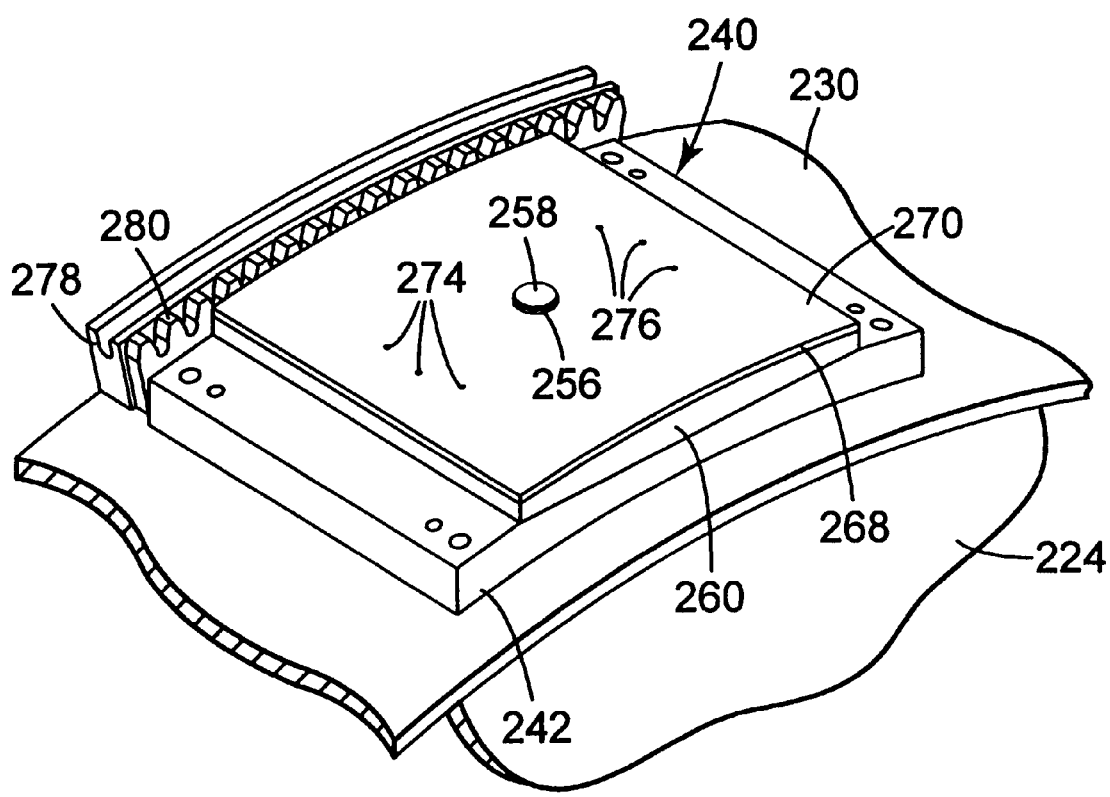
FIG. 8 is an isometric view of a second fixture mounted on the apparatus of FIG. 3.

FIG. 8 illustrates second fixture 240 mounted on outer shelf 230 of second rotary support 222. Preferably, second fixture 240 is constructed in accordance with any of the various embodiments of first fixture 140 described above. In the embodiment illustrated in FIG. 8, second fixture 240 includes base 242 mounted on shelf 230. Base cover 260 is mounted to the front surface of the base 242. Resilient pad 268 is attached to the front surface of the base cover 260. Outer surface 270 of the resilient pad forms the convexly curved surface of the fixture 240 as was described above with respect to outer surface 170 of first fixture 140. In the illustrated embodiment, vacuum holes 276 are in communication with the forward vacuum chamber and rear vacuum holes 274 are in communication with the rear vacuum chamber of the fixture 240. Pin 256 is shown extending out of the fixture 240.

As illustrated in FIGS. 6 and 7, first holder 140 has associated therewith an optional tongue segment 178 and first gear segment 180. As shown in FIG. 8, second fixture 240 has associated therewith a grooved segment 278 and second gear segment 280. The tongue segment 178 of the first fixture is configured to be received in the grooved segment 278 associated with the second fixture. In this way, the lateral relative position of fixtures 140 and 240 can be closely controlled by the engagement of tongue 178 with groove 278. The circumferential position of first fixture 140 relative to second fixture 240 can be closely controlled by the intermeshing of first gear segment 180 with second gear segment 280. In this way, the first and second members 12, 40 can be assembled with a high degree of precision of the relative position between the two members. Such an optional arrangement may not be necessary for sufficiently rigid and precise fixtures and holders.

In alternate embodiments of holders 120, 220, the fixtures may instead be mounted on any suitable rotary support. Examples of such supports include elongate arms pivotally mounted to a frame, spoked wheels rather than center plates, or any other similarly functioning structure. The rotary support may reciprocate back and forth about its axis of rotation rather than follow a full circular path about its axis of rotation.

Figure 9A:
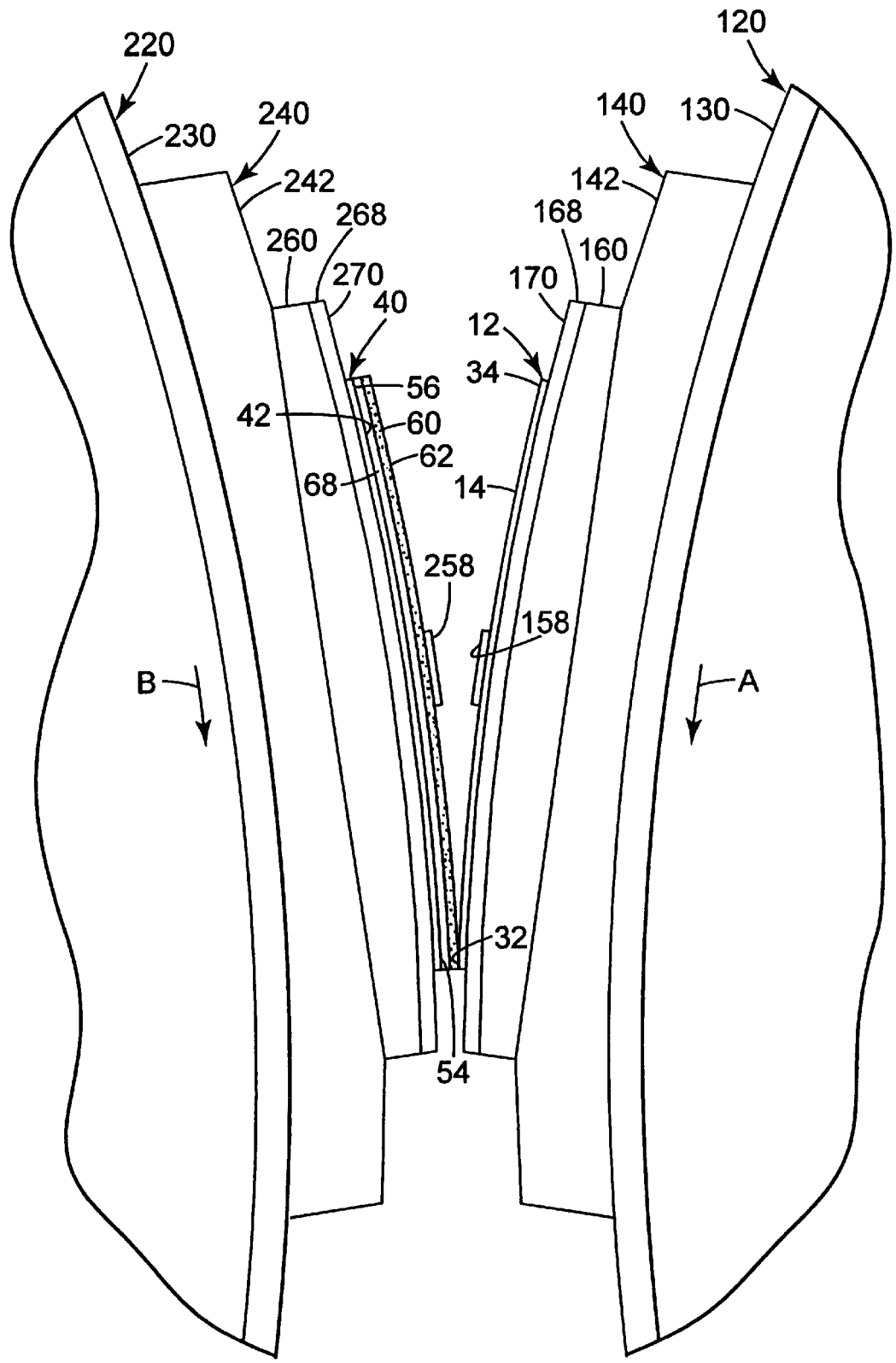
FIGS. 9a, 9b, and 9c are side views of a portion of a preferred apparatus of the present invention carrying out a preferred embodiment of a method according to the present invention.
Figure 9B:
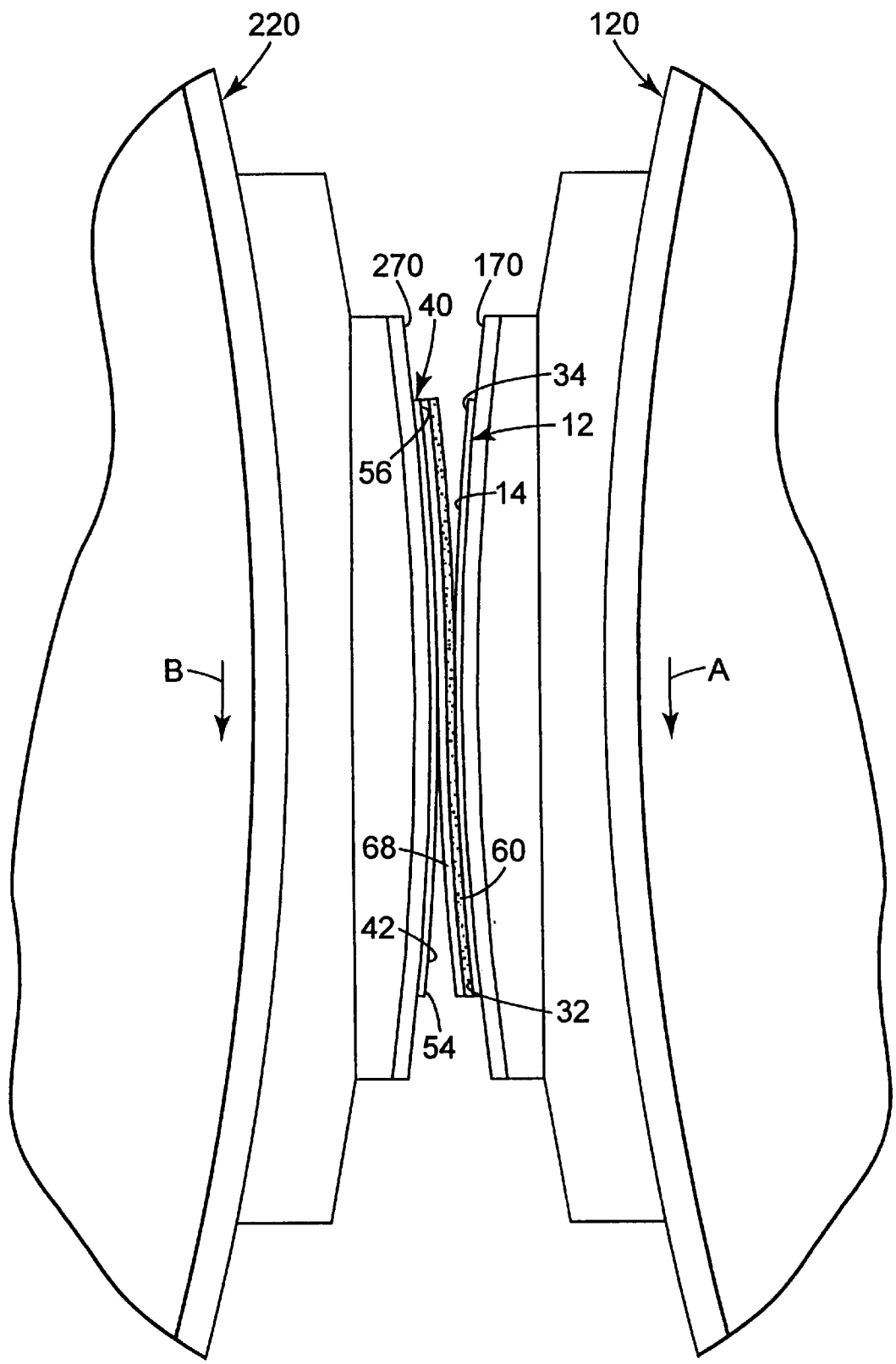
Figure 9C:
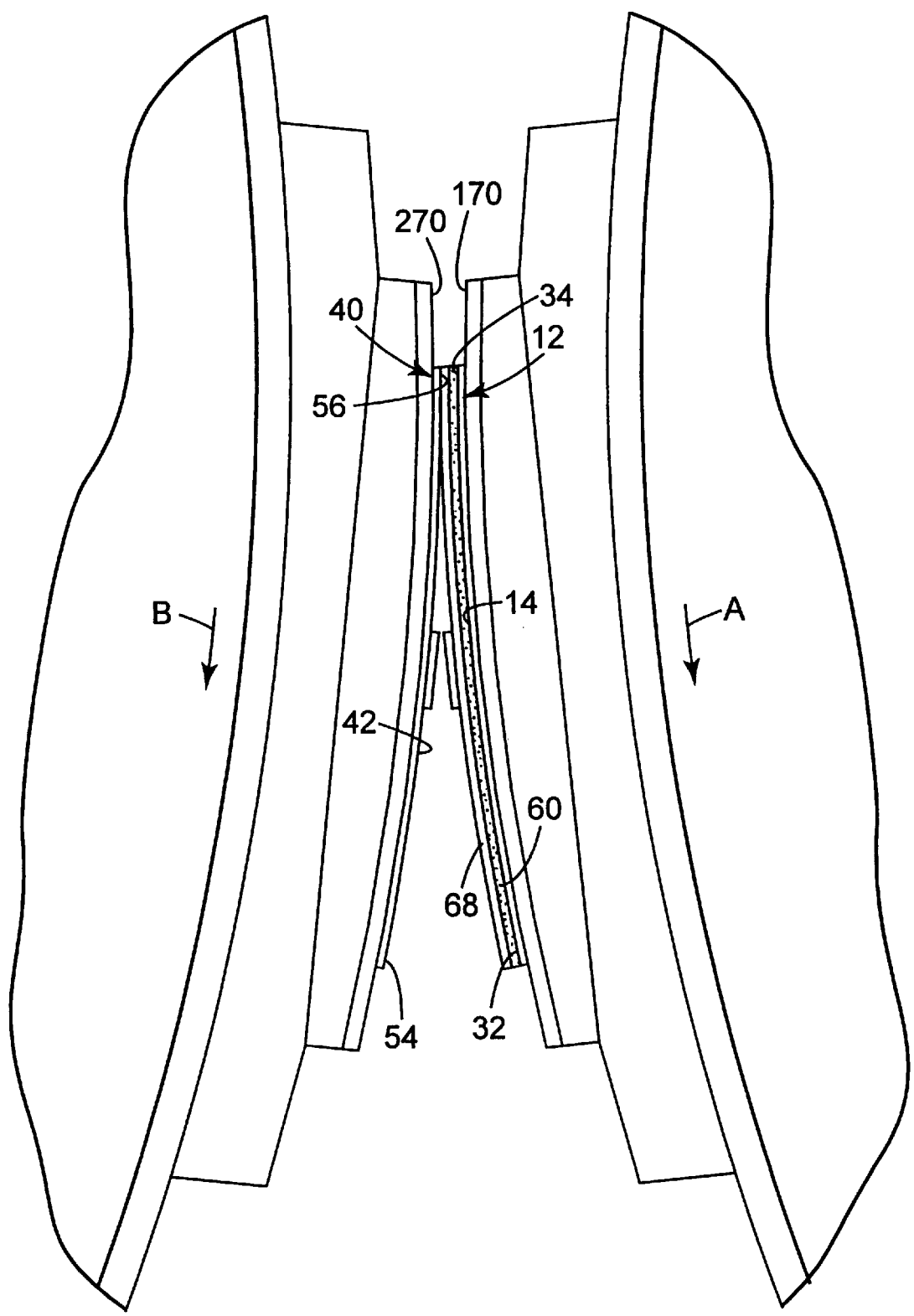

FIGS. 9a, 9b, and 9c are side views of a portion of the preferred apparatus described above carrying out a preferred embodiment of a first method according to the present invention. As seen in FIG. 9a, first member 12 of the optical recording medium is mounted on the convexly curved surface 170 of the first fixture 140. First member 12 is releasably affixed to the surface 170 (such as by vacuum or adhesion as described above) with the inner surface 14 of the first member 12 facing outwardly. Tip 158 of locator pin 156 is seen extending beyond the inner surface 14 of the first member 12. Second member 40 of the optical recording medium is releasably attached to the second convexly curved surface 270 of second fixture 240. Second member 40 is oriented so as to have inner surface 42 facing away from the fixture 240. It is thus seen that the inner surface 14 of the first member is facing the inner surface 42 of the second member. Tip 258 of second pin 256 is seen extending beyond the surface of the second member. The first and second members are mounted on the surfaces 170, 270 of the fixtures so as to substantially conform to the contour of the surfaces 170, 270. Preferably, at least one of the inner surfaces is convexly curved. More preferably, both inner surfaces 14, 42 are convexly curved. Still more preferably, the inner surfaces 14, 42 are curved to a substantially arcuate configuration. In a particularly preferred embodiment, the inner surfaces 14, 42 are substantially arcuate with a radius of curvature substantially equal to the radial distance from the respective inner surface to the center of rotation of holders 120, 220.

The method illustrated in FIGS. 9a through 9c is used for applying a bonding layer 60 to one of the members 12, 40. In the illustrated embodiment, the method is used to apply bonding layer 60 to the inner surface 14 of the first member 12. In a preferred embodiment, bonding layer 60 is a laminating pressure sensitive adhesive which is provided commercially with a first release liner on its first surface 62 and a second release liner 68 on its second surface 64. However, the release liner need not be a separate article provided with the bonding layer, and instead may be provided on the fixture. In this regard, the term "release liner" as used herein, including the claims, refers to any member or surface that is suitable for temporarily and releasably holding the bonding layer during the methods described herein. As illustrated, the first release liner has already been removed from the bonding layer 60. Second release liner 68 is releasably attached to the inner surface 42 of the second member 40, such as with an adhesive tape. In this manner, the exposed surface 62 of the bonding layer 60 is 10 presented for attachment to the inner surface 14 of the first member 12. First holder 120 is then rotated in direction A which causes second holder 220 to rotate in direction B as shown. The first portion 32 of the outer annulus on the inner surface 14 of the first member 12 comes into contact with the first surface 62 of the bonding layer 60. As illustrated in FIG. 9b, rotation of first holder 120 in direction A and holder 220 in direction B continues. It is seen that the bonding layer 60 and release liner 68 have been transferred from the second member 40 to the first member 12 in the area of the first portion 32 and continuing towards the center of the first member 12. Spring loaded locating pins 156 and 256 have contacted one another and depressed one another into their respective fixtures. As the holders 120, 220 continue to rotate as illustrated in FIG. 9c, transfer of the bonding layer 60 and release liner 68 to the inner surface 14 of the first member 12 has progressed to the second portion 34 of the outer annulus on the first member. Application of the bonding layer 60 to the first member is thus substantially complete. Rotation of holders 120 and 220 in directions A and B continues until the first and second fixtures are clear of one another.

Preferably at least one of the bonding layer 60 and first member 12 are convexly curved when applying the bonding layer. More preferably, both members 12, 40 are convexly curved during application of the bonding layer 60 to one of the members. In this manner, the bonding layer 60 is progressively applied from the first portion of the inner surface to a diametrically opposed second portion progressively. This progressive application helps minimize or eliminate entrapment of bubbles between the bonding layer 60 and the first member 12. Ideally, contact between the bonding layer 60 and the first member 12 begins at a point on the inner surface 14 immediately adjacent the OD 26. However, satisfactory results are obtained when contact begins at first portion 32 which is located in the outer annulus 30. It is understood that first portion 32 may be a small area rather than a mathematically defined point, and that first portion 32 may be located a very small distance inward from the OD 26. Alternative to the illustrated embodiment, the bonding layer 60 may be mounted directly on surface 270, without second member 40 present. Furthermore, bonding layer 60 may be initially held by any other suitable fixture on holder 220, or directly on the outer surface of shelf 230, or by any other like means. Bonding layer 60 may be initially applied to either member 12, 40.

The first member 12, with bonding layer 60 thereon, is now ready to have a second member 40 applied thereto. Preferably, second member 40 is applied by the method described below with respect to FIGS. 10a through 10c. However, it is understood that second member 40 can be applied by any suitable means as desired.

Figure 10A:
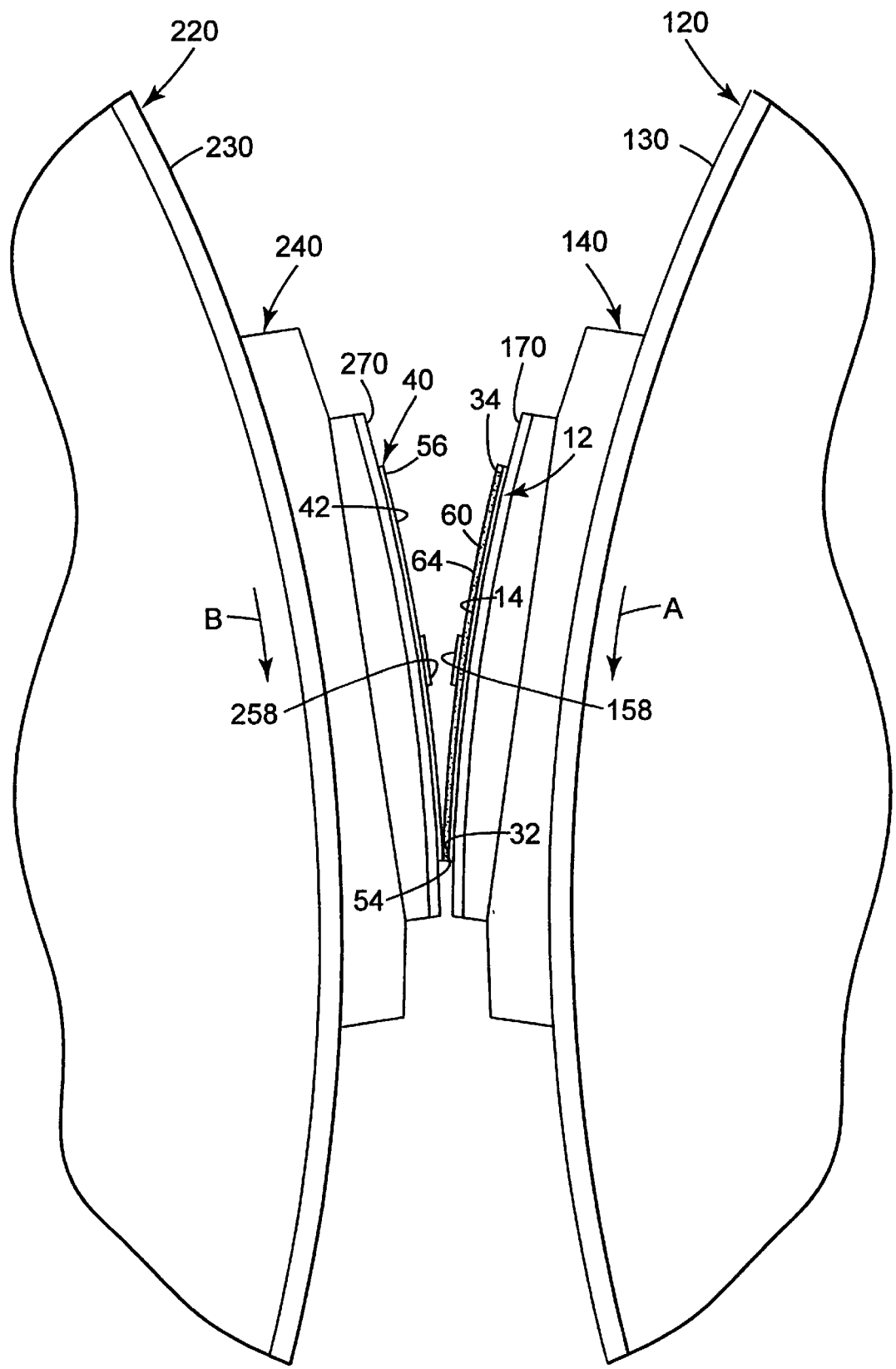
FIGS. 10a, 10b, and 10c are front elevational views of a portion of a preferred apparatus of the present invention carrying out a preferred embodiment of another method according to the present invention.
Figure 10B:
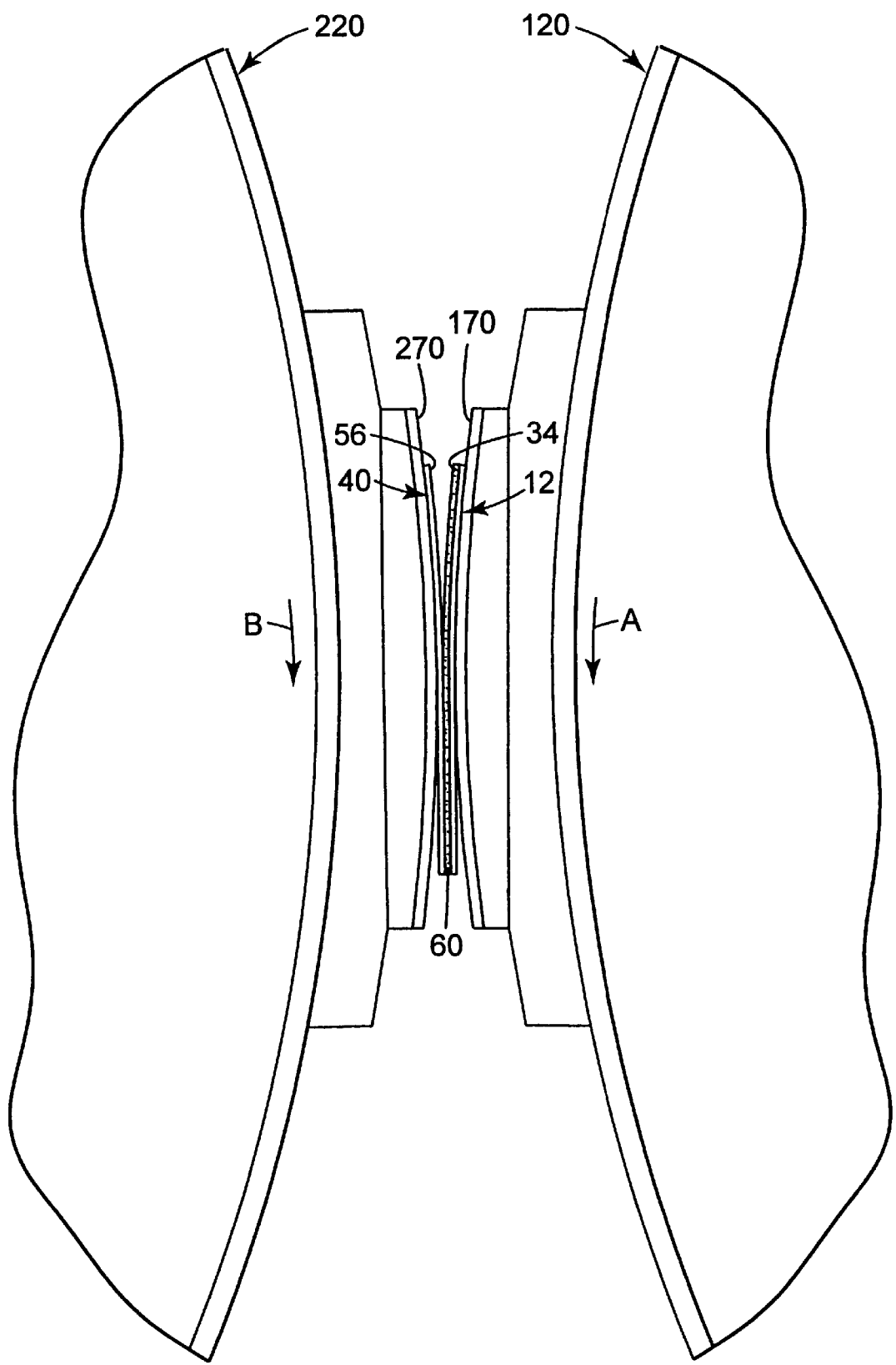
Figure 10C:
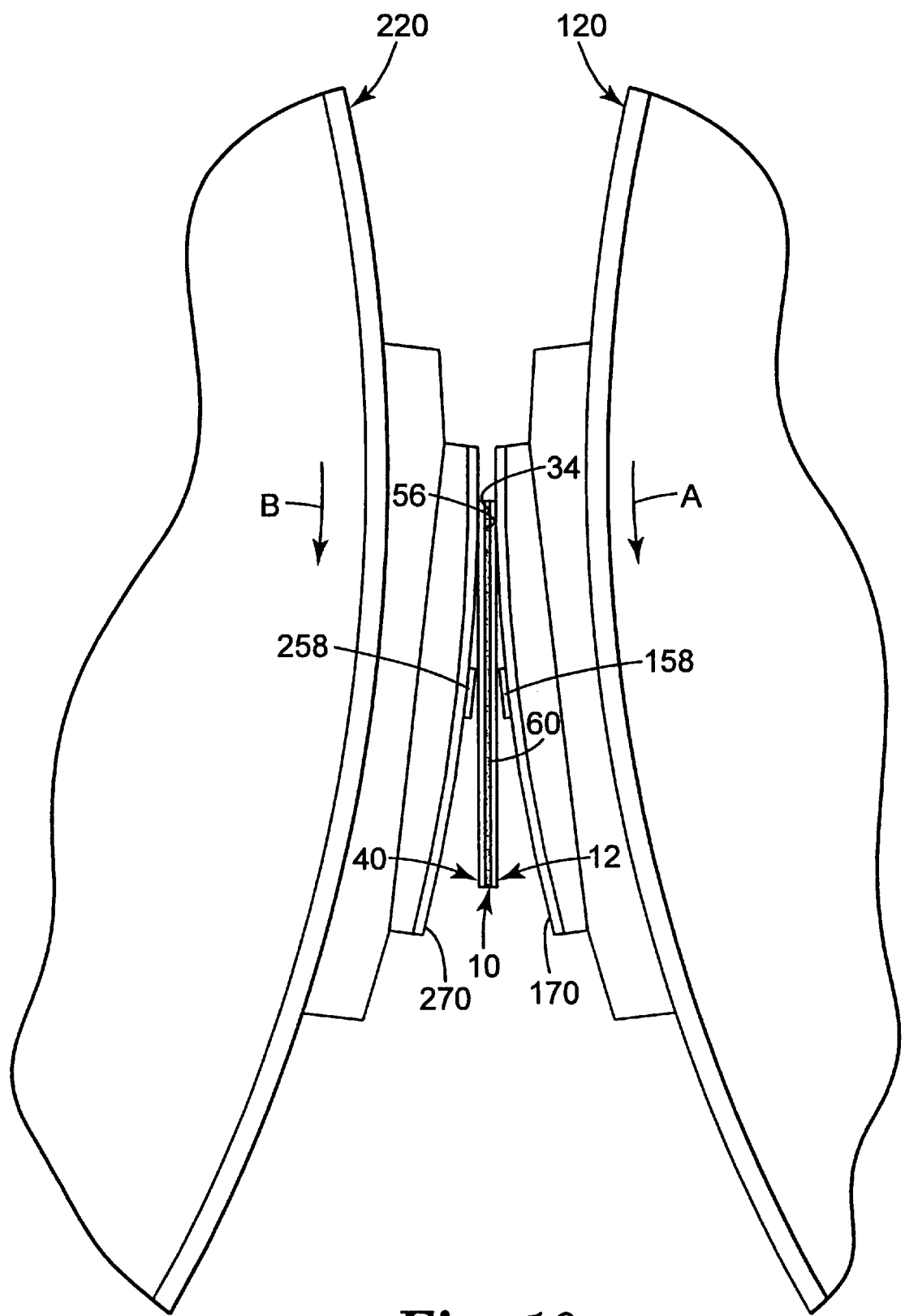

A preferred embodiment of a second method of the present invention is illustrated with respect to FIGS. 10a through 10c. In this method, the two members 12, 40 are bonded together to form optical recording medium 10. In this preferred embodiment of the method, either or both of the first and second members has a bonding layer 60 already applied thereto. Preferably, bonding layer 60 has been applied according to the method described above with respect to FIGS. 9a through 9c. However, it is understood that any suitable method for applying a bonding layer to either or both of the members 12, 40 may be used. FIG. 10a illustrates first member 12 releasably mounted onto convexly curved surface 170 of the first fixture 140, such as by the vacuum arrangement described above with respect to FIG. 5. First member 12 is releasably attached to convexly curved surface 170 so as to have its outer surface 16 facing the fixture and its inner surface 14 facing away from the fixture. Second release liner 68 has been removed from the bonding layer 60 to thereby expose second surface 64 of the bonding layer 60. Tip 158 of the locating pin 156 extends beyond surface 14 of the first member. Second member 40 is releasably affixed to the convexly curved surface 270 of second fixture 240 such as by the vacuum arrangement described above. Second member 40 is oriented so as to have outer surface 44 facing the fixture 240 and inner surface 42 facing away. In this manner the inner surfaces 14, 42 of the two members are oriented for assembly to one another. Preferably one, and more preferably both of the surfaces 14, 42 are convexly curved. Still more preferably, one or both of the surfaces 14, 42 are arcuately curved In the most preferred embodiment, one or both of the surfaces 14, 42 are arcuately curved so as to have a radius of curvature substantially equal to the radial distance from the respective surface and the center of rotation of its respective holder. Still more preferably, both surfaces 14, 42 have substantially the same radius of curvature.

As illustrated in FIG. 10a, first holder 120 is rotated in direction A causing second holder 220 to rotate in direction B so as to bring first portion 32 of the first member 12 in contact with the first portion 54 of the second member 40. As used herein, including the claims, the term "contacting" when used to describe the assembly of the inner surface 14 and inner surface 42 of the two members, is used to indicate that the inner surfaces are contacting one another via the bonding layer 60, that is with the bonding layer 60 between the inner surfaces. The force of this contact is determined with cylinder 110, by controlling either the force exerted by the first holder 120 onto the second holder 220, or by setting the gap between the two surfaces 170, 270 of the fixtures. As illustrated in FIG. 10b, rotation of the holders continues such that the first and second members 12, 40 are bonded together by bonding layer 60 starting from first portions 32, 52 and progressing towards the centers of the members. Locator pins 156, 256 have contacted one another causing them to retract into their respective fixtures. The vacuum applied by the forward chamber 145 in the first fixture 140 and forward chamber 245 in second fixture 240 has been released in FIG. 10b, allowing the forward portion of the assembled disk 10 to be released from both fixtures. Rotation of holder 120 in direction A and 220 in direction B continues as illustrated in FIG. 10c towards second portion 34 of the first member and second portion 56 of the second member. Assembly of the first and second members is substantially complete at this point, with continued rotation allowing the disk 10 to come free from the two holders as the vacuum applied by the rearward vacuum chambers is released. Ideally, contact between members 12 and 40 begins at a point on inner surfaces 14,42 immediately adjacent ODs 26,48, respectively. However, satisfactory results are obtained when contact begins at first portions 32, 54 which are located in outer annulus 30, 52, respectively. It is understood that first portions 32, 54 and second portions 34, 56 may be small areas rather than mathematically defined points, and that these portions may be located a very small distance inward from the OD of the member.

In embodiments in which an adhesive is used to releasably mount the first and second members to the curved surfaces 170, 270, the method illustrated in FIGS. 10a through 10c may differ in that one of the members may remain on its fixture. As the members are bonded together, one member will transfer its fixture to the other. Similarly, the vacuum applied by one fixture may be retained while the vacuum applied by the other fixture is progressively released to allow one member to transfer to the other fixture as assembly progresses from FIGS. 10a through 10c.

By keeping at least one, and preferably both, of the members curved, assembly progresses from the respective first portions across the inner surfaces to the respective second portions thereby minimizing or eliminating trapped air between the bonding layer and the inner surfaces of the member. By maintaining both members at substantially the same radius of curvature on the fixtures, the members have substantially equal and opposite stresses as they are bonded together at the nip formed between the two fixtures. In this way, the stress in the assembled optical recording medium 10 is balanced so as to provide for an optimally flat optical recording medium 10.

The apparatus and methods described above were described with respect to a single fixture 140, 240 on each holder 120, 220. It is understood that for continuous manufacturing processes, it may be desirable to put a plurality of fixtures 140 and 240 onto each rotary holder 120, 220. In such an arrangement, linkage 114 as illustrated may not be suitable for continued rotation of the two members holders about a full circular path. In such an embodiment, it would be possible to index rotation of the two holders relative to one another by use of any other suitable means, such as by a gear system, a gear and chain system, optical sensors and servos, and the like.

Figure 11:
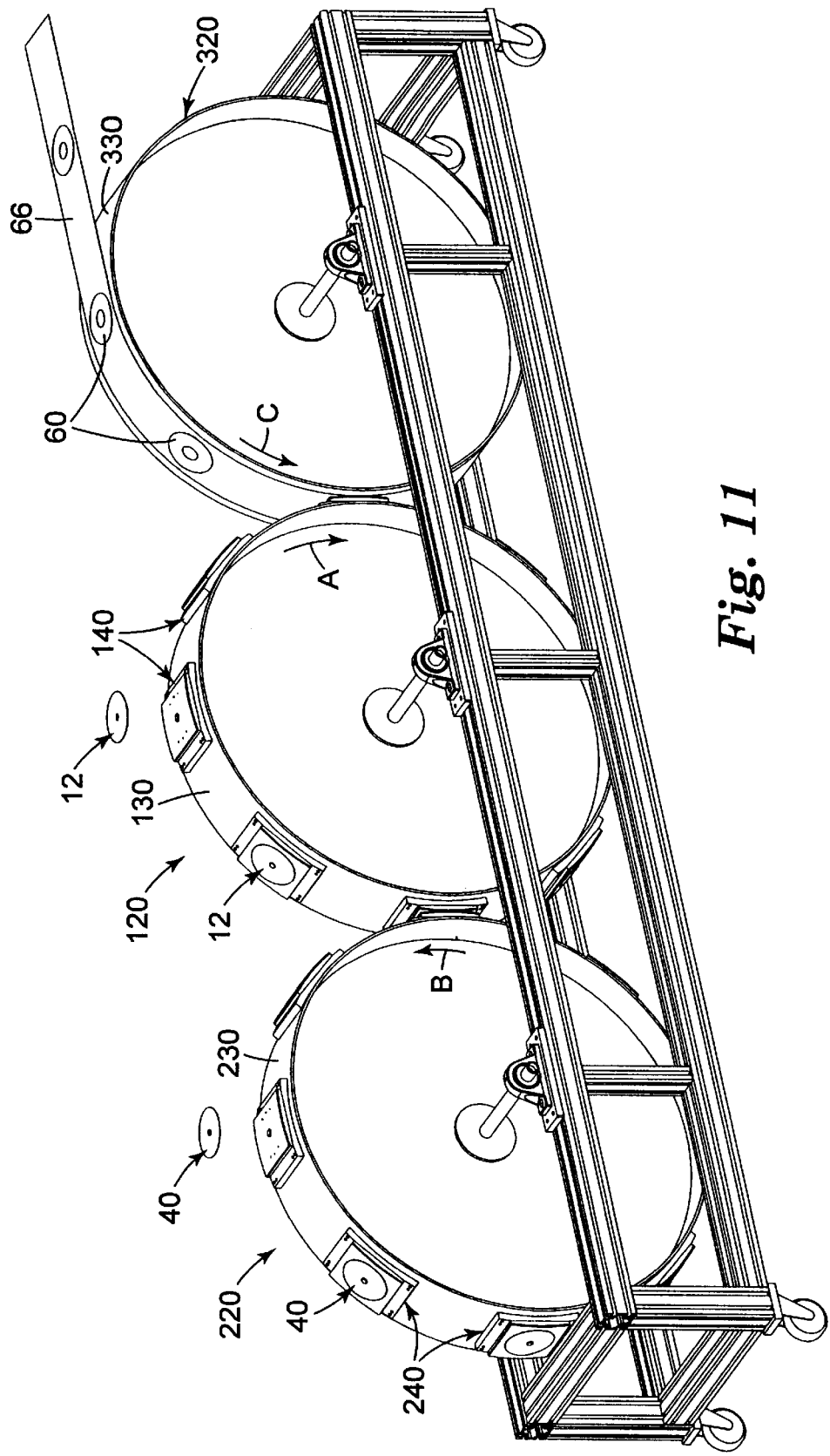
FIG. 11 is an isometric view of an alternate preferred embodiment of an apparatus of the present invention.

It may be also desirable to apply the bonding layer 60 continuously rather than as illustrated in the two methods described above with respect to FIGS. 9*a* through 9*c* and 10*a* through 10*c*. FIG. 11 is an isometric illustration of a preferred apparatus which includes a third holder 320. This third holder may be provided with die cut portions of bonding layer 60 for affixation to the first member 12 provided on the first holder 120 in a manner similar to that described with respect to FIGS. 9*a* through 9*c* above, with the release liner removed continuously as illustrated. First member 12 with bonding 60 thereon is then brought into contact with the second member 40 which is provided on second holder 220. Bonding first and second members 12 and 40 together is performed substantially as described with respect to FIGS. 10*a* through 10*c* above. Furthermore, as long as rotation of each of the respective holders 120, 220, 320 is indexed, it is not important which of the holders rotates clockwise or counterclockwise. As illustrated in FIG. 11, bonding layer 60 may be maintained at a curved, and preferably arcuate contour, either by being provided on the outer surface of outer shelf 330 itself, or by any suitable fixture.

In bonding the two members 12, 40 together, it is preferred that each member be curved substantially to the same degree for the reasons discussed above. The amount and degree of this curvature can be determined in accordance with the teachings of the present application by one skilled in the art and may depend on various factors such as the size, thickness and material of the members 12, 40, the type and amount of bonding layer 60 used, and by the degree of flatness that is desired or required. In determining the desired degree of curvature, it is understood that a larger size holder 120, 220, 320 will result in a greater radius of curvature; that is, a less curved member. The radius should be selected so as to provide sufficient curvature to prevent entrapment of air as described above, while not providing an exceeding amount of curvature so as to impart an undesirably high amount of stress into the first and second members during assembly. Similarly, the material, size, thickness, and hardness of the optional resilient pad 168, 268, may be determined in accordance with the teachings herein by one of skill in the art. Suitable materials for the pads include rubber pads such as silicone rubber, neoprene rubber and butyl rubber, and foam pads such as polyolefin foam. Each fixture may have pads of the same or different material, thickness, and hardness. Suitable results have been achieved with silicone rubber pads having a Shore A hardness of from 30–70; polyurethane foam pads having a density of 15 lbs./ft$^3$(2360 N/m$^3$), a compression force of 13–23 psi (90 to 160 kPa) for 30% deflection, and a thickness of from 0.0625 to 0.125 in (1.6 to 3.2 mm); polyurethane foam pads having a density of 25 lbs.ft$^3$ (3930 N/m$^3$), a compression force of 51 psi (350 kPa) for 30% deflection, and a thickness of 0.03 in (0.8 mm); polyurethane foam pads having a density of 20 lbs./ft$^3$ (3140 N/m$^3$), a compression force of 28 psi (190 kPa) for 30% deflection, and a thickness of 0.125 in (3.2 mm); and polyethylene foam pads having a density of 11 lbs./ft$^3$ (1730 N/m$^3$), and a thickness of 0.105 in (2.7 mm).

Optionally, a secondary holder may be placed on surface 170. Such a holder preferably has the same periphery as the resilient pad 168. The secondary holder is preferably of substantially the same thickness, strength, and flexibility as the member 12, 40 to be mounted on the fixture. The secondary holder has a hole therein for receiving the member 12, 40. In this manner, the exposed surface of the secondary holder and the inner surface 14, 42 of the member 12, 40 will present a substantially continuous surface.

Figure 12:
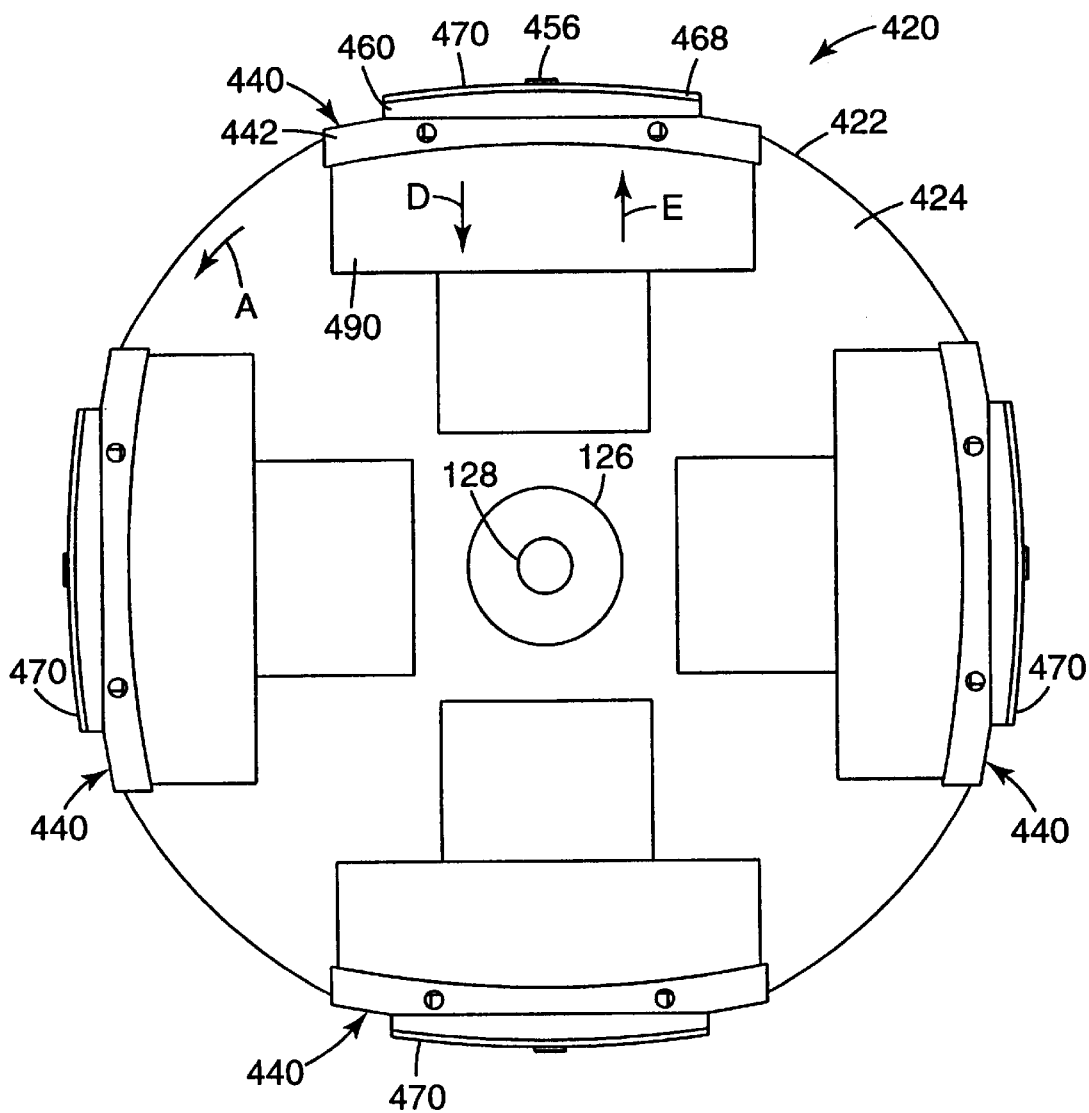
FIG. 12 is a partially schematic side view of another alternate preferred embodiment of an apparatus of the present invention.

FIG. 12 is a partially schematic side view of another alternate preferred embodiment of a holder and fixture. This embodiment allows use of fixture 440 having convexly curved surface 470 that has a radius of curvature that is larger than the radius of the path the fixture travels. Stated another way, the radial distance from surface 470 to the center of rotation about shaft 128 may be smaller than the radius of curvature of surface 470. This allows use of a more compact holder 420 while using a larger radius of curvature for surface 470, to minimize the amount of bending of members 12, 40. This may also be used with fixtures in which surface 470 is not arcuate, but which instead has a radius of curvatures that varies. One or more fixtures 440 may be mounted on rotary support 422 of holder 420. In one embodiment, rotary support 422 comprises a center plate 424, having flange 126 and shaft 128 mounted thereto. As with the embodiments discussed above, fixture 440 comprises a base 442, cover 460, optional resilient pad 468, and locator pin 456. In this embodiment, the fixture 440 is mounted to the rotary support by a radial mount 490. Radial mount 490 allows the fixture 440 to move radially inward in direction D and radially outward in direction E as the holder 420 rotates in direction A. Because the radius of curvature of surface 470 is different from the distance from surface 470 to the center of rotation about shaft 128, surface 470 must move radially as the point of contact progresses from first portion 32 to second portion 34 on the member 12. This can be accomplished by any suitable radial mount 490. Examples includes a simple slidable mount on the rotary support 422 and a spring to bias the fixture 440 radially outward Other examples include a mechanically operated radial mount 490 to positively move the fixture 420 in and out in response to various input such as the circumferential location of the fixture, the force imparted on the fixture, or the distance between opposite fixtures. This arrangement can be used on holders 420 that traverse a full circular path or that reciprocate back and forth. This arrangement is suitable for applying the bonding layer to a member and/or for attaching two members together.

In the most preferred embodiment, the bonding layer 60 is applied by the methods and apparatus described herein, and the members 12, 40 are then bonded together according to the apparatus and methods described herein. However, the bonding layer 60 may be applied by a method described herein, and the members 12, 40 subsequently bonded together by any suitable method. Likewise, bonding layer 60 may be applied by any suitable alternative method, and the members 12,40 may then be bonded together by the methods and apparatus described herein. For example, it may be preferable to perform the methods described herein in a vacuum, in a gas that is highly soluble in the material of the bonding layer 60, or in a gas that is highly insoluble in the material of the bonding layer 60. Suitable alternate methods for applying adhesive, or for assembling disks together after adhesive has been applied, are taught for example in U.S. patent application Ser. No. 09/021,255, "Method Of Manufacturing An Optical Recording Medium" filed on Feb. 10, 1998; WIPO International Patent Application Publication No. WO 98/08220, "Process for Bonding Optical Media"; and in Japanese Patent Application 19523/98, "Bonded Optical Discs As Well As Method And Apparatus For Producing The Same," inventor Kazuta Saito, et al., filed on Jan. 30, 1998, the entire disclosures of all of which are hereby incorporated by reference.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

Test Methods
Determination of Flatness

The flatness of a bonded disk was determined using a Schenk Flatness Measurement System, Model No. PLT1, provided by Dr. Schenk GmbH, Industriemes Stechnik, Munchen, Germany. A bonded sample disk was placed in a holder and the top and bottom surfaces of the spinning disk were scanned at points on the inner radius (25 mm), the middle radius (37 mm), and the outer radius (57 mm) with laser beams. The maximum and minimum values of the radial deviation and the tangential deviation were recorded. An industry target for a disk having acceptable flatness has a radial deviation of+or−0.8 degrees and a tangential deviation of+or−0.3 degrees.

General Preparation of Bonded Disks

Using the apparatus of FIGS. 3 and 4, a first member 12 of a DVD disk was positioned on the fixture 140 by setting the center hole of the member over the locating pin. The fixture may additionally comprise a resilient pad. Pressure sensitive adhesive film sheet (Optically Clear Laminating Pressure Sensitive Adhesive #8142, available from 3M Company, St. Paul, Minn., USA) having a thickness of 58 microns was laid on the second fixture 240. The pressure sensitive adhesive film had a smooth polyester release liner on the side that contacted the fixture. The adhesive film was held in place by 3M 236 Masking Tape laid along the edges of the film. Vacuum was then applied to hold the first member 12 on the fixture 140. First holder 120 was then rotated approximately 100 degrees. Second holder 220 followed it by means of a steel band connecting first and second holders, thus bringing the first member in contact with the adhesive and laminating it to the first member by means of the nip created between the fixtures on the holders. The first member bearing the adhesive was removed from the fixture and the excess adhesive was trimmed off. The first member bearing the adhesive was placed back on the fixture so that the adhesive was facing away from the fixture. A second member of a DVD disk was positioned on the second fixture 240. Vacuum was applied to hold both members on the fixtures. First holder 120 was then rotated approximately 100 degrees bringing the first member bearing the adhesive in contact with second member by means of the nip created between the fixtures on the holders. When the first portions of the outer annuluses of the first and second members entered the nip area, the vacuum was released from the forward vacuum chambers. The forward portion of the assembled disk then left the nip tangent to both fixtures. When the second portions of the outer annuluses of the first and second members entered the nip area, the vacuum was released from the rear vacuum chambers. Rotation was continued until the assembled disk was freed from the holders and it dropped out of the bottom of the nip.

Examples 1–12

Sample disks were prepared according to the General Preparation of Bonded Disks described above. In Examples 1–7 and 9–11, the first and second members were 120 mm in diameter, 0.6 mm in thickness and made of polycarbonate with an aluminized surface. In Examples 8 and 12, the first member of was 120 mm in diameter, 0.6 mm in thickness and made of clear polycarbonate and the second member was 120 mm in diameter, 0.6 mm in thickness, and made of polycarbonate with an aluminumized surface. A 3.18 mm (0.125 inches) thick silicone rubber resilient pad was used as part of the fixtures. The durometer (Shore A Hardness) of the pad was either 60 or 30 as reported in Table 1 below. The members of Examples 1–10 were held on the fixtures by vacuum. The members of Examples 11–12 were held on the fixtures by a double sided pressure sensitive adhesive tape (3M "DLT" Tape). The force at nip point (nip force) was varied by changing the air pressure to cylinder 110 and is reported in Table 1 below. The flatness of the bonded disks was determined according to Determination of Flatness test method outlined above. The radial deviation and tangential deviation are reported in Table 1.

TABLE 1

| Ex. | Pad Durometer (Shore A) | Nip Force Kg. (lbs) | Measurement Position on Disk Radius | Radial Deviation (degrees) | | Tangential Deviation (degrees) | |
|---|---|---|---|---|---|---|---|
| | | | | Min. | Max. | Min. | Max. |
| 1 | 60 | 71.4 (157) | Inner, top | −0.38 | −0.05 | −0.20 | +0.25 |
| | | | Inner, bottom | +0.05 | +0.42 | −0.26 | +0.21 |
| | | | Middle, top | −0.39 | −0.01 | −0.22 | +0.27 |
| | | | Middle, bottom | +0.04 | +0.44 | −0.29 | +0.21 |
| | | | Outer, top | −0.43 | +0.03 | −0.28 | +0.24 |
| | | | Outer, bottom | −0.03 | +0.48 | −0.24 | +0.27 |
| 2 | 60 | 71.4 (157) | Inner, top | −0.24 | +0.00 | −0.16 | +0.13 |
| | | | Inner, bottom | +0.04 | +0.27 | −0.15 | +0.18 |
| | | | Middle, top | −0.35 | −0.03 | −0.15 | +0.15 |
| | | | Middle, bottom | +0.06 | +0.39 | −0.18 | +0.16 |
| | | | Outer, top | −0.44 | +0.32 | −0.13 | +0.17 |
| | | | Outer, bottom | +0.03 | +0.44 | −0.19 | +0.15 |
| 3 | 60 | 57.3 (126) | Inner, top | −0.47 | +0.05 | −0.18 | +0.16 |
| | | | Inner, bottom | −0.05 | +0.49 | −0.17 | +0.20 |
| | | | Middle, top | −0.47 | +0.17 | −0.17 | +0.17 |
| | | | Middle, bottom | −0.17 | +0.51 | −0.19 | +0.17 |
| | | | Outer, top | −0.52 | +0.31 | −0.27 | +0.26 |
| | | | Outer, bottom | −0.31 | +0.57 | −0.27 | +0.25 |
| 4 | 60 | 57.3 (126) | Inner, top | −0.24 | +0.02 | −0.08 | +0.06 |
| | | | Inner, bottom | +0.02 | +0.25 | −0.07 | +0.09 |
| | | | Middle, top | −0.30 | +0.12 | −0.06 | +0.09 |
| | | | Middle, bottom | −0.07 | +0.32 | −0.09 | +0.07 |
| | | | Outer, top | −0.44 | +0.30 | −0.23 | +0.25 |
| | | | Outer, bottom | −0.14 | +0.63 | −0.19 | +0.23 |

TABLE 1-continued

| Ex. | Pad Durometer (Shore A) | Nip Force Kg. (lbs) | Measurement Position on Disk Radius | Radial Deviation (degrees) Min. | Max. | Tangential Deviation (degrees) Min. | Max. |
|---|---|---|---|---|---|---|---|
| 5 | 30 | 86.8 (191) | Inner, top | −0.25 | +0.09 | −0.05 | +0.10 |
| | | | Inner, bottom | −0.12 | +0.29 | −0.12 | +0.07 |
| | | | Middle, top | −0.39 | +0.20 | −0.14 | +0.17 |
| | | | Middle, bottom | −0.17 | +0.45 | −0.21 | +0.12 |
| | | | Outer, top | −0.51 | +0.53 | −0.31 | +0.27 |
| | | | Outer, bottom | −0.33 | +0.56 | −0.29 | +0.31 |
| 6 | 30 | 86.8 (191) | Inner, top | −0.41 | +0.00 | −0.14 | +0.16 |
| | | | Inner, bottom | −0.03 | +0.43 | −0.18 | +0.14 |
| | | | Middle, top | −0.52 | +0.07 | −0.10 | +0.21 |
| | | | Middle, bottom | −0.06 | +056 | −0.23 | +0.12 |
| | | | Outer, top | −0.65 | +0.19 | −0.18 | +0.26 |
| | | | Outer, bottom | −0.24 | +0.65 | −0.29 | +0.17 |
| 7 | 30 | 57.3 (126) | Inner, top | −0.43 | +0.01 | −0.17 | +0.15 |
| | | | Inner, bottom | +0.02 | +0.42 | −0.14 | +0.17 |
| | | | Middle, top | −0.40 | −0.06 | −0.18 | +0.17 |
| | | | Middle, bottom | +0.06 | +0.41 | −0.17 | +0.18 |
| | | | Outer, top | −0.35 | −0.07 | −0.21 | +0.19 |
| | | | Outer, bottom | +0.07 | +0.40 | −0.17 | +0.22 |
| 8 | 30 | 57.3 (126) | Inner, top | −0.57 | +0.37 | −0.29 | +0.25 |
| | | | Inner, bottom | −0.38 | +0.55 | −0.23 | +0.28 |
| | | | Middle, top | −0.30 | +0.43 | −0.34 | +0.30 |
| | | | Middle, bottom | −0.42 | +0.32 | −0.27 | +0.34 |
| | | | Outer, top | −0.04 | +0.66 | −0.45 | +0.36 |
| | | | Outer, bottom | −0.66 | +0.01 | −0.33 | +0.45 |
| 9 | 30 | 142.7 (314) | Inner, top | −0.35 | +0.19 | −0.22 | +0.26 |
| | | | Inner, bottom | −0.19 | +0.34 | −0.25 | +0.19 |
| | | | Middle, top | −0.35 | +0.19 | −0.33 | +0.33 |
| | | | Middle, bottom | −0.19 | +0.36 | −0.32 | +0.29 |
| | | | Outer, top | −0.39 | +0.20 | −0.44 | +0.40 |
| | | | Outer, bottom | −0.20 | +0.36 | −0.40 | +0.40 |
| 10 | 30 | 28.6 (63) | Inner, top | −0.53 | +0.24 | −0.30 | +0.32 |
| | | | Inner, bottom | −0.42 | +0.57 | −0.32 | +0.32 |
| | | | Middle, top | −0.55 | +0.24 | −0.40 | +0.42 |
| | | | Middle, bottom | −0.25 | +0.60 | −0.42 | +0.43 |
| | | | Outer, top | −0.58 | +0.30 | −0.44 | +0.48 |
| | | | Outer, bottom | −0.16 | +0.63 | −0.49 | +0.47 |
| 11 | 30 | 28.6 (63) | Inner, top | −0.25 | +0.14 | −0.15 | +0.18 |
| | | | Inner, bottom | −0.15 | +0.27 | −0.17 | +0.17 |
| | | | Middle, top | −0.24 | +0.11 | −0.22 | +0.20 |
| | | | Middle, bottom | −0.12 | +0.25 | −0.17 | +0.24 |
| | | | Outer, top | −0.30 | +0.18 | −0.27 | +0.25 |
| | | | Outer, bottom | −0.12 | +0.36 | −0.22 | +0.28 |
| 12 | 60 | 71.4 (157) | Inner, top | −0.43 | −0.01 | −0.33 | +0.21 |
| | | | Inner, bottom | −0.02 | +0.42 | −0.19 | +0.34 |
| | | | Middle, top | −0.45 | +0.05 | −0.42 | +0.16 |
| | | | Middle, bottom | −0.03 | +0.46 | −0.17 | +0.43 |
| | | | Outer, top | −0.32 | +0.45 | −0.50 | +0.30 |
| | | | Outer, bottom | −0.47 | +0.29 | −0.30 | +0.49 |

Examples 13–15

Sample disks were prepared as described in Examples 1–12 described above except that 3.94 mm (0.155 inches) thick polyethylene foam, prepared by combining several thickness of foam, was used in place of the silicone rubber as the resilient pad For Example 13, the first member and second members were the same as those used for Examples 1–7 and 9–11. For Examples 14 and 15, the first and second members were the same as those used for Examples 8 and 12. The members of Examples 13 and 14 were held on the fixtures by vacuum. The members of Examples 15 were held on the fixtures by a double sided pressure sensitive adhesive tape (3M "DLT" Tape). The force at nip point (nip force) was 57.3 kg.(126 lbs). The flatness of the bonded disks was determined according to Determination of Flatness test method outlined above. The radial deviation and tangential deviation are reported in Table 2.

TABLE 2

| Ex. | Measurement Position on Disk Radius | Radial Deviation (degrees) Min. | Max. | Tangential Deviation (degrees) Min. | Max. |
|---|---|---|---|---|---|
| 13 | Inner, top | −0.30 | −0.02 | −0.08 | +0.10 |
| | Inner, bottom | +0.02 | +0.34 | −0.11 | +0.07 |
| | Middle, top | −0.30 | −0.02 | −0.10 | +0.11 |
| | Middle, bottom | +0.02 | +0.35 | −0.13 | +0.12 |
| | Outer, top | −0.26 | +0.04 | −0.15 | +0.19 |
| | Outer, bottom | −0.03 | +0.41 | −0.19 | +0.16 |
| 14 | Inner, top | −0.53 | +0.09 | −0.24 | +0.16 |
| | Inner, bottom | −0.10 | +0.48 | −0.15 | +0.22 |
| | Middle, top | −0.22 | +0.18 | −0.26 | +0.19 |
| | Middle, bottom | +0.17 | +0.24 | −0.17 | +0.24 |
| | Outer, top | +0.03 | +0.55 | −0.29 | +0.25 |
| | Outer, bottom | −0.59 | −0.04 | −0.23 | +0.28 |
| 15 | Inner, top | −1.29 | +0.40 | −0.39 | +0.32 |
| | Inner, bottom | −0.39 | +1.35 | −0.31 | +0.36 |
| | Middle, top | −1.24 | +0.82 | −0.54 | +0.44 |
| | Middle, bottom | −0.77 | +1.24 | −0.43 | +0.50 |
| | Outer, top | −1.02 | +1.31 | −0.68 | +0.59 |
| | Outer, bottom | −1.32 | +0.96 | −0.58 | +0.62 |

Examples 16–20

These Examples demonstrate that during the step of applying the bonding layer of the process of the invention additional stress in not induced into a disk member.

The flatness of a sample disk member 120 mm in diameter, 0.6 mm in thickness and made of polycarbonate with an aluminized surface (same as used for Examples 1–7 and 9–11) was determined according to Determination of Flatness test method outlined above. Then, using the apparatus of FIGS. 3 and 4, the sample member was positioned on the 3.18 mm (0.125 inches) thick Shore A hardness 30 silicone rubber resilient pad of fixture 140 by setting the center hole of the member over the locating pin. Pressure sensitive adhesive film sheet (Optically Clear Laminating Pressure Sensitive Adhesive #8142, available from 3M Company, St Paul, Minn., USA) having a thickness of 58 microns was laid on the 3.18 mm (0.125 inches) thick Shore A hardness 30 silicone rubber resilient pad of second fixture 240. The pressure sensitive adhesive film had a smooth polyester release liner on the side that contacted the fixture. The adhesive film was held in place by 3M 236 Masking Tape laid along the edges of the film. For examples 16–19, vacuum was used to hold the first member 12 on the fixture 140. For example 20, the autoadhesion of the silicone resilient pad was used to hold the first member on the fixture. First holder 120 was then rotated approximately 100 degrees. Second holder 220 followed it by means of a steel band connecting first and second holders, thus bring the first member in contact with the adhesive and laminating it to the first member by means of the nip created between the fixtures on the holders. Nip force was 57.3 kg. (126 lbs). The first member bearing the adhesive film was removed from fixture and the excess adhesive film was trimmed off. The liner was removed from the adhesive film and the flatness of the member with adhesive attached was determined according to Determination of Flatness test method outlined above. The radial deviation and tangential deviation of the member with and without the adhesive are reported in Table 3.

TABLE 3

| Ex. | Measurement Position on Disk Radius | Radial Deviation Without Adhesive (degrees) | | Tangential Deviation Without Adhesive (degrees) | | Radial Deviation With Adhesive (degrees) | | Tangential Deviation With Adhesive (degrees) | |
|---|---|---|---|---|---|---|---|---|---|
| | | Min. | Max. | Min. | Max. | Min. | Max. | Min. | Max. |
| 16 | Inner, top | −0.31 | +0.33 | −0.28 | +0.35 | −0.11 | +0.39 | −0.23 | +0.27 |
| | Inner, bottom | −0.32 | +0.30 | −0.35 | +0.26 | −0.41 | +0.11 | −0.27 | +0.21 |
| | Middle, top | +0.35 | +0.69 | −0.31 | +0.40 | +0.51 | +0.79 | −0.23 | +0.32 |
| | Middle, bottom | −0.66 | −0.31 | −0.38 | +0.29 | −0.78 | −0.49 | −0.31 | +0.21 |
| | Outer, top | +0.70 | +1.19 | −0.20 | +0.32 | +0.72 | +1.14 | −0.15 | +0.26 |
| | Outer, bottom | −1.19 | −0.69 | −0.31 | +0.10 | −1.32 | −0.75 | −0.24 | +0.16 |
| 17 | Inner, top | +0.07 | +0.58 | −0.26 | +0.21 | +0.00 | +0.45 | −0.15 | +0.15 |
| | Inner, bottom | −0.57 | −0.09 | −0.21 | +0.24 | −0.46 | −0.04 | −0.16 | +0.15 |
| | Middle, top | +0.35 | +0.91 | −0.27 | +0.32 | +0.12 | +0.81 | −0.17 | +0.28 |
| | Middle, bottom | −0.87 | −0.35 | −0.30 | +0.26 | −0.80 | −0.09 | −0.25 | +0.17 |
| | Outer, top | +0.58 | +1.23 | −0.30 | +0.46 | +0.29 | +1.06 | −0.34 | +0.38 |
| | Outer, bottom | −1.25 | −0.56 | −0.44 | +0.29 | −1.15 | −0.29 | −0.37 | +0.36 |
| 18 | Inner, top | +0.19 | +0.59 | −0.25 | +0.28 | +0.07 | +0.50 | −0.14 | +0.21 |
| | Inner, bottom | −0.58 | −0.19 | −0.28 | +0.24 | −0.51 | −0.06 | −0.23 | +0.15 |
| | Middle, top | +0.46 | +0.78 | −0.27 | +0.36 | +0.39 | +0.71 | −0.16 | +0.29 |
| | Middle, bottom | −0.75 | −0.43 | −0.36 | +0.26 | −0.68 | −0.36 | −0.30 | +0.15 |
| | Outer, top | +0.75 | +1.06 | −0.25 | +0.39 | +0.70 | +0.95 | −0.22 | +0.30 |
| | Outer, bottom | −1.08 | −0.73 | −0.40 | +0.24 | −1.07 | −0.74 | −0.32 | +0.23 |
| 19 | Inner, top | +0.08 | +0.66 | −0.21 | +0.17 | +0.04 | +0.52 | −0.16 | +0.21 |
| | Inner, bottom | −0.65 | −0.06 | −0.17 | +0.23 | −0.56 | −0.02 | −0.21 | +0.17 |
| | Middle, top | +0.13 | +0.86 | −0.22 | +0.18 | +0.25 | +0.83 | −0.18 | +0.22 |
| | Middle, bottom | −0.82 | −0.12 | −0.19 | +0.24 | −0.83 | −0.23 | −0.21 | +0.20 |
| | Outer, top | +0.31 | +1.13 | −0.24 | +0.30 | +0.40 | +1.07 | −0.27 | +0.29 |
| | Outer, bottom | −1.16 | −0.31 | −0.32 | +0.24 | −1.21 | −0.42 | −0.30 | +0.28 |
| 20 | Inner, top | −0.07 | +0.29 | −0.20 | +0.29 | +0.02 | +0.49 | −0.18 | +0.31 |
| | Inner, bottom | −0.29 | +0.08 | −0.28 | +0.19 | −0.50 | −0.03 | −0.32 | +0.16 |
| | Middle, top | +0.07 | +0.61 | −0.25 | +0.28 | +0.33 | +0.78 | −0.15 | +0.30 |
| | Middle, bottom | −0.59 | −0.05 | −0.27 | +0.24 | −0.76 | −0.30 | −0.29 | +0.14 |
| | Outer, top | +0.36 | +1.06 | −0.30 | +0.28 | +0.52 | +1.02 | −0.21 | +0.29 |
| | Outer, bottom | −1.09 | −0.33 | −0.27 | +0.29 | −1.12 | −0.54 | −0.28 | +0.21 |

Examples 21–24

These examples illustrate a method of assembling a disk using the process of this invention to apply a bonding layer to a first member and a second, different process to apply the second member to the first member.

A single first member having an adhesive film (i.e., with release liner on the adhesive) on one side was prepared using the materials and the method described in Examples 16–19 except that the nip force was not recorded but believed to be in the range of 57.3–136.4 kg. (126–300 lbs). For Examples 21 and 22, the disk member was the same as that used for Examples 1–7, and 9–11. For Examples 23 and 24, the disk member was the same as that used for Examples 8 and 12. The release liner was removed to expose the adhesive and a second disk member was bonded to the first disk member via the adhesive using the apparatus described in and shown in FIG. 4 of Japanese Patent Application 19523/98, "Bonded Optical Discs As Well As Method And Apparatus For Producing the Same", inventor Kazuta Saito et al., filed on Jan. 30, 1998. Specifically, the members were placed in the bonding apparatus in a predetermined position, and bonded to each other under reduced pressure of 1.0 Torr. The flatness of the bonded disks was determined according to Determination of Flatness test method outlined above. The radial deviation and tangential deviation are reported in Table 4.

TABLE 4

| Ex. | Measurement Position on Disk Radius | Radial Deviation (degrees) | | Tangential Deviation (degrees) | |
|---|---|---|---|---|---|
| | | Min. | Max. | Min. | Max. |
| 21 | Inner, top | −0.34 | −0.01 | −0.15 | +0.22 |
| | Inner, bottom | +0.03 | +0.34 | −0.22 | +0.14 |
| | Middle, top | −0.30 | −0.01 | −0.15 | +0.24 |
| | Middle, bottom | +0.02 | +0.29 | −0.24 | +0.13 |
| | Outer, top | −0.33 | +0.02 | −0.19 | +0.26 |
| | Outer, bottom | −0.10 | +0.25 | −0.25 | +0.18 |
| 22 | Inner, top | −0.29 | +0.00 | −0.06 | +0.07 |
| | Inner, bottom | +0.01 | +0.29 | −0.07 | +0.08 |
| | Middle, top | −0.33 | +0.01 | −0.07 | +0.09 |
| | Middle, bottom | +0.00 | +0.32 | −0.09 | +0.07 |
| | Outer, top | −0.43 | +0.01 | −0.13 | +0.13 |
| | Outer, bottom | −0.10 | +0.35 | −0.15 | +0.13 |
| 23 | Inner, top | −0.55 | −0.09 | −0.22 | +0.19 |
| | Inner, bottom | +0.11 | +0.53 | −0.18 | +0.20 |
| | Middle, top | −0.43 | −0.04 | −0.20 | +0.15 |
| | Middle, bottom | +0.06 | +0.40 | −0.15 | +0.18 |
| | Outer, top | −0.31 | +0.12 | −0.13 | +0.16 |
| | Outer, bottom | −0.17 | +0.23 | −0.15 | +0.11 |
| 24 | Inner, top | −0.59 | −0.01 | −0.15 | +0.25 |
| | Inner, bottom | +0.02 | +0.62 | −0.25 | +0.14 |
| | Middle, top | −0.50 | −0.06 | −0.20 | +0.27 |
| | Middle, bottom | +0.05 | +0.50 | −0.28 | +0.19 |
| | Outer, top | −0.34 | +0.02 | −0.22 | +0.26 |
| | Outer, bottom | −0.10 | +0.24 | −0.25 | +0.20 |

The tests and test results described above are intended solely to be illustrative, rather than predictive, and variations in the testing procedure can be expected to yield different results.

All patents and patent applications cited herein are hereby incorporated by reference.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of assembling together first and second members of an optical recording medium, wherein each of the members includes an inner surface and an outer surface, wherein at least one of the inner surfaces includes a bonding layer thereon, and wherein at least one of the members includes a data storage surface, the method comprising the steps of:
   a) curving the first member such that the first member inner surface is convex, wherein the first member inner surface includes an outer annulus, and wherein the outer annulus includes a first portion and a second portion;
   b) curving the second member such that the second member inner surface is convex and orienting the second member such that the second member inner surface faces the first member inner surface, wherein the second member inner surface includes an outer annulus, and wherein the outer annulus includes a first portion and a second portion;
   c) contacting the first portion of the first member outer annulus and the first portion of the second member outer annulus together under pressure; and
   d) rotating the first and second members relative to one another so as to progressively contact under pressure the first member inner surface and second member inner surface together from their respective outer annulus first portions to their respective outer annulus second portions to thereby attach together the inner surfaces of the first and second members.

2. The method of claim 1, wherein steps a) and b) comprise curving the first and second members to substantially the same contour.

3. The method of claim 1, wherein step a) comprises curving the first member to an arcuate contour.

4. The method of claim 3, wherein step b) comprises curving the second member members to an arcuate contour.

5. The method of claim 1, wherein step d) further includes maintaining the entire inner surface of one of said first and second members curved.

6. The method of claim 5, comprising the further step of:
   e) concurrently with step d), progressively releasing the curvature of the other one of said first and second members as the members attach together.

7. The method of claim 1, comprising the further step of:
   e) concurrently with step d), progressively releasing the curvature of both of said members from the respective first portions of the annulus to the respective second portions of the annulus as the members attach together.

8. The method of claim 1, wherein step d) further includes translating the first member about a first arcuate path and translating the second member about a second arcuate path.

9. The method of claim 1, wherein the bonding layer comprises a pressure sensitive adhesive.

10. The method of claim 1, wherein step a) includes releasably mounting the first member on a first fixture having a convex surface.

11. The method of claim 10, wherein step a) includes releasably mounting the first member on a convex surface of a resilient pad on the fixture.

12. The method of claim 11 wherein the resilient pad is a foam pad.

13. The method of claim 10, wherein the first member is held to the convex surface of the fixture by a vacuum.

14. The method of claim 1, wherein step a) includes releasably mounting the first member on a first fixture having a convex surface, and wherein step b) includes releasably mounting the second member on a second fixture having a convex surface.

15. A method of applying a bonding layer to a member of an optical recording medium, the bonding layer including an exposed surface, the member including an inner surface and an outer surface, the method comprising the steps of:
   a) curving the member such that the member inner surface is convex, wherein the member inner surface includes an outer annulus, and wherein the outer annulus includes a first portion and a second portion;
   b) curving the bonding layer such that the exposed surface is convex and orienting the bonding layer such that the exposed surface of the bonding layer is facing the member inner surface,
   c) contacting the first portion of the member outer annulus and exposed surface of the bonding layer together under pressure; and
   d) progressively contacting the exposed surface of the bonding layer from the first portion of the member outer annulus to the second portion of the member outer annulus to thereby bond together the member inner surface and the bonding layer.

16. The method of claim 15, wherein steps a) and b) comprise curving the member and the bonding layer to substantially the same contour.

17. The method of claim 15, wherein step a) comprises curving the member to an arcuate contour.

18. The method of claim 17, wherein step b) comprises curving the bonding layer to an arcuate contour.

19. The method of claim 15, wherein step d) further includes maintaining the entire inner surface of the member curved.

20. The method of claim 15, wherein step d) further includes translating the member about a first arcuate path and translating the bonding layer about a second arcuate path.

21. The method of claim 15, wherein the bonding layer comprises a pressure sensitive adhesive.

22. The method of claim 15, wherein the optical recording medium member is a first member, and comprising the further step of:
   f) thereafter bonding a second member of the optical recording medium to the first, wherein the second member includes an inner surface facing the inner surface of the first member.

23. The method of claim 22, wherein the inner surface of the second member includes an outer annulus, wherein the outer annulus includes a first portion and a second portion, and wherein step f) comprises:
   f. i) curving one of the first and second members such that its inner surface is convex;

f. ii) orienting the other of the first and second members such that the first and second inner surfaces are facing one another;

f. iii) contacting the first portion of the first member outer annulus and the first portion of the second member outer annulus together under pressure; and f. iv) rotating the first and second members relative to one another so as to progressively contact under pressure the first member inner surface and second member inner surface together from their respective outer annulus first portions to their respective outer annulus second portions to thereby attach together the inner surfaces of the first and second members.

24. The method of claim 23, wherein step f. ii) further includes curving the other of the first and second members such that its inner surface is convex.

25. The method of claim 24, wherein steps f. i) and f. ii) comprise curving the first and second members to substantially the same contour.

26. The method of claim 23, wherein step f. i) comprises curving the member to an arcuate contour.

27. The method of claim 24, wherein steps f. i) and f. ii) comprise curving the first and second members to an arcuate contour.

28. The method of claim 24, wherein step f. iv) further includes translating the first member about a first arcuate path and translating the second member about a second arcuate path.

29. The method of claim 15, wherein step a) includes releasably mounting the member on a first fixture having a convex surface.

30. The method of claim 29, wherein step a) includes releasably mounting the first member on a convex surface of a resilient pad on the fixture.

31. The method of claim 30, wherein the resilient pad is a foam pad.

32. The method of claim 29, wherein the member is held to the convex surface of the fixture by a vacuum.

33. The method of claim 15, wherein step a) includes releasably mounting the member on a first fixture having a convex surface, and wherein step b) includes releasably mounting the bonding layer on a second fixture having a convex surface.

34. The method of claim 24, wherein step f. i) includes releasably mounting the member on a first fixture having a convex surface.

35. The method of claim 34, wherein the member is held to the convex surface of the fixture by a vacuum.

36. The method of claim 25, wherein step f. i) includes releasably mounting the one member on a first fixture having a convex surface, and wherein step f. ii) includes releasably mounting the other member on a second fixture having a convex surface.

* * * * *

UNITED STATES PATENT AND TRADEMARK OFFICE
CERTIFICATE OF CORRECTION

PATENT NO. : 6,066,218
DATED : May 23, 2000
INVENTOR(S) : Gary K. Kuhn, Jack L. Perecman, Gary L. Romberg, Kevin J. Bangen, and Richard E. Bennett It is certified that error appears in the above-identified patent and that said Letters Patent is hereby corrected as shown below:

Title page,
Under "References Cited," the following should be added:

-- U.S. PATENT DOCUMENTS

| | | |
|---|---|---|
| 1,206,656 | 11/28/16 | Benedictus |
| 3,666,603 | 05/30/72 | Kuhns, et al. |
| 3,689,346 | 09/05/72 | Rowland |
| 3,873,395 | 03/25/75 | Ehrlich |
| 4,181,752 | 01/01/80 | Martens et al. |
| 4,367,107 | 01/04/83 | Valimont et al. |
| 4,374,077 | 02/15/83 | Kerfeld |
| 4,414,316 | 11/08/83 | Conley |
| 4,418,120 | 11/29/83 | Kealy et al. |
| 4,420,502 | 12/13/83 | Conley |
| 4,503,531 | 03/05/85 | Kato |
| 4,571,124 | 02/18/86 | Matsui et al. |
| 4,576,850 | 03/18/86 | Martens |
| 4,670,316 | 06/02/87 | Kryder |
| 4,684,454 | 08/04/87 | Gardner |
| 4,693,943 | 09/15/87 | Kishi et al. |
| 4,760,012 | 07/26/88 | Mochizuki et al. |
| 4,939,011 | 06/03/90 | Takahashi et al. |
| 5,059,462 | 11/22/91 | Kurisu et al. |
| 5,151,310 | 09/29/92 | Yanagisawa et al. |
| 5,167,996 | 12/01/92 | Kurisu et al. |
| 5,175,030 | 12/29/92 | Lu et al. |
| 5,183,597 | 02/02/93 | Lu |
| 5,188,875 | 02/23/93 | Yamaoka et al. |
| 5,214,947 | 06/01/93 | Sissala et al. |
| 5,244,775 | 09/14/93 | Miwa et al. |
| 5,284,538 | 02/08/94 | Suzuki et al. |
| 5,378,517 | 01/03/95 | Suzuki et al. |
| 5,399,220 | 03/21/95 | Winslow |
| 5,487,926 | 01/30/96 | Kuribayashi et al. |
| 5,538,774 | 07/23/96 | Landin et al. |
| 5,582,677 | 12/10/96 | Miwa et al. --; |

UNITED STATES PATENT AND TRADEMARK OFFICE
CERTIFICATE OF CORRECTION

PATENT NO. : 6,066,218            Page 2 of 3
DATED : May 23, 2000
INVENTOR(S) : Gary K. Kuhn, Jack L. Perecman, Gary L. Romberg, Kevin J. Bangen, and Richard It is certified that error appears in the above-identified patent and that said Letters Patent is hereby corrected as shown below:

Under "FOREIGN PATENT DOCUMENTS," the following should be added:

| | | |
|---|---|---|
| -- WO 85/01913 | 05/09/85 | PCT |
| WO 95/13331 | 05/18/95 | PCT |
| WO 95/29764 | 11/09/95 | PCT |
| WO 95/29765 | 11/09/95 | PCT |
| WO 95/29776 | 11/09/95 | PCT |
| WO 97/36737 | 10/98/97 | PCT |
| WO 97/36738 | 10/09/97 | PCT |
| WO 97/02950 | 01/30/97 | PCT |
| WO 98/08220 | 02/26/98 | PCT |
| 0 330 197 A2 | | EPO |
| 0 463 382 A2 | | EPO |
| 0 526 244 A2 | | EPO |
| 0 624 870 A2 | | EPO |
| 0 720 159 A2 | | EPO |
| 0 725 396 A2 | | EPO |
| 0 729 142 A1 | | EPO |
| Hei 8[1996]96415 | | Japan |
| JP07262619 | | Japan |
| JP 07014215 | | Japan |
| 3-203828 | | Japan |
| 4-344344 | | Japan |
| 63[1988]49424 | | Japan |
| 62[1987]36480 | | Japan |
| 9293272 A | | Japan --; |

Under "OTHER PUBLICATIONS," the following should be added:
-- Japanese Journal of Electronic Materials, *Denshi Zairyo*, special edition, June 1996, pp. 46-49 ECMA/TC31/97/1, Geneva Switzerland, January 1997

BULLETIN 101, December 1996, Imation Corporation, Oakdale, MN

R&D MAGAZINE, July 1997, pp. 24-26 and 28, "A Rose by Any Other Name Couldn't Hold This Much Data"

RADTECH REPORT, March/April 1997, pp. 25-27

HANDBOOK OF PRESSURE SENSITIVE TECHNOLOGY; D. Satas ed; Second Edition, New York, 1989, pp. 396-491 --;

UNITED STATES PATENT AND TRADEMARK OFFICE
CERTIFICATE OF CORRECTION

PATENT NO. : 6,066,218
DATED : May 23, 2000
INVENTOR(S) : Gary K. Kuhn, Jack L. Perecman, Gary L. Romberg, Kevin J. Bangen, and Richard E. Bennett It is certified that error appears in the above-identified patent and that said Letters Patent is hereby corrected as shown below:

Column 1,
Line 38, after "industry", insert -- consortium --;

Column 7,
Line 23, "31/9712" should read -- 31/97/2;

Column 12,
Line 63, after "60 is" delete -- 10--;

Column 23,
Line 52, delete "members";

Column 29,
Line 29, "surface," should read -- surface; --.

Signed and Sealed this

Thirteenth Day of November, 2001

Attest:

NICHOLAS P. GODICI
Attesting Officer   Acting Director of the United States Patent and Trademark Office